(12) United States Patent
Oouchida

(10) Patent No.: US 9,267,797 B2
(45) Date of Patent: Feb. 23, 2016

(54) RANGE-FINDING DEVICE AND IMAGING APPARATUS

(75) Inventor: Shigeru Oouchida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 1054 days.

(21) Appl. No.: 13/163,918

(22) Filed: Jun. 20, 2011

(65) Prior Publication Data

US 2011/0310290 A1 Dec. 22, 2011

(30) Foreign Application Priority Data

Jun. 22, 2010 (JP) ................................. 2010-141632
Jul. 22, 2010 (JP) ................................. 2010-164882

(51) Int. Cl.
*G01C 3/08* (2006.01)
*G02B 7/30* (2006.01)

(52) U.S. Cl.
CPC . *G01C 3/085* (2013.01); *G02B 7/30* (2013.01)

(58) Field of Classification Search
CPC ................. H04N 5/23212; G02B 7/32; G02B 7/34–7/346; G01B 11/026
USPC .......................................... 348/348; 356/3.14
See application file for complete search history.

(56) References Cited

U.S. PATENT DOCUMENTS

| | | | |
|---|---|---|---|
| 5,608,513 A | 3/1997 | Komatsu et al. | |
| 5,666,567 A | 9/1997 | Kusaka | |
| 6,046,795 A * | 4/2000 | Sugiyama ................ | G01C 3/08 250/201.6 |
| 6,243,537 B1 | 6/2001 | Higashino | |
| 6,434,332 B1 * | 8/2002 | Kindaichi ..................... | 396/123 |
| 6,642,998 B2 * | 11/2003 | Nakagawa ............... | G01C 3/08 356/3.08 |
| 7,020,391 B2 * | 3/2006 | Ohkado ........................ | 396/111 |
| 7,450,171 B2 * | 11/2008 | Ide et al. ....................... | 348/345 |
| 7,865,076 B2 | 1/2011 | Tamaki et al. | |
| 8,237,841 B2 * | 8/2012 | Tanida et al. ................. | 348/335 |
| 8,274,586 B2 * | 9/2012 | Katsuno et al. .............. | 348/294 |

(Continued)

FOREIGN PATENT DOCUMENTS

| JP | 2002-90616 | 3/2002 |
|---|---|---|
| JP | 2002-250857 A | 9/2002 |

(Continued)

OTHER PUBLICATIONS

Extended European Search Report issued Feb. 13, 2012 in Patent Application No. 11170984.6.

(Continued)

*Primary Examiner* — Roberto Velez
*Assistant Examiner* — Cynthia Segura
(74) *Attorney, Agent, or Firm* — Oblon, McClelland, Maier & Neustadt, L.L.P.

(57) ABSTRACT

A range-finding device includes a plurality of image pickup units disposed at a predetermined interval with each other, a lens unit to form subject images of a subject on the plurality of image pickup units, the image pickup units on which the subject image is formed outputting signals of the subject image, and a distance calculation unit to calculate a distance to the subject based on the signals output from the image pickup units. The plurality of image pickup units are formed on a single substrate. The subject image is formed through the lens unit on at least two image pickup units of the plurality of image pickup units. The distance calculation unit calculates a distance to the subject based on the signals output from the at least two image pickup units on each of which the subject image is formed.

6 Claims, 12 Drawing Sheets

(56) References Cited

U.S. PATENT DOCUMENTS

| | | |
|---|---|---|
| 8,369,700 B2* | 2/2013 | Oouchida ............... 396/111 |
| 2003/0086013 A1 | 5/2003 | Aratani |
| 2003/0103769 A1* | 6/2003 | Ohkado ............ G03B 7/099 396/111 |
| 2003/0147638 A1* | 8/2003 | Takasaki ............ G02B 7/28 396/111 |
| 2004/0071457 A1* | 4/2004 | Nonaka et al. ............. 396/89 |
| 2004/0240052 A1* | 12/2004 | Minefuji ........ G02B 13/0015 359/435 |
| 2006/0244945 A1 | 11/2006 | Yamaguchi |
| 2007/0215912 A1* | 9/2007 | Kido et al. ............... 257/257 |
| 2007/0280626 A1* | 12/2007 | Haddock ............ G01S 11/12 385/147 |
| 2008/0211957 A1* | 9/2008 | Ishikawa ................. 348/345 |
| 2008/0302947 A1 | 12/2008 | Utagawa |
| 2011/0170086 A1 | 7/2011 | Oouchida |
| 2011/0188843 A1 | 8/2011 | Oouchida |

FOREIGN PATENT DOCUMENTS

| | | | |
|---|---|---|---|
| JP | 2003-143459 | 5/2003 | |
| JP | 4138867 | 6/2008 | |
| JP | 2008-286527 A | 11/2008 | |
| WO | WO 2009153907 A1 * | 12/2009 | ........ H01L 27/14 |

OTHER PUBLICATIONS

Partial European Search Report issued Oct. 12, 2011, in Patent Application No. 11170984.6.

Combined Office Action and Search Report issued Oct. 17, 2013 in Chinese Patent Application No. 201110169383.1 (with English language translation).

Office Action issued Aug. 27, 2013, in Japanese Patent Application No. 2010-141632.

* cited by examiner

RANGE-FINDING DEVICE AND IMAGING APPARATUS

CROSS REFERENCE TO RELATED APPLICATIONS

The present application is based on and claims priority from Japanese Application Numbers 2010-141632, filed on Jun. 22, 2010 and 2010-164882, filed on Jul. 22, 2010, the disclosure of which is hereby incorporated by reference herein in its entirety.

BACKGROUND OF THE INVENTION

1. Field of the Invention

The present invention relates to a range-finding device configured to measure a distance to a subject to be photographed, and an imaging apparatus such as a digital still camera, a digital video camera, and the like, which has the range-finding device.

2. Description of the Related Art

As a digital still camera (referred to as a digital camera, hereinafter) having an autofocus (AF) function, a range-finding device in which an outer measurement triangulation system is applied is conventionally known (see Japanese Patent Application Publication No. 2002-90616).

The range-finding device having a triangulation system includes a pair of range-finding lenses disposed at a predetermined interval and a pair of planar range-finding image pickup units on which subject images are formed through the range-finding lenses, respectively. By detecting a disparity between the subject images formed on the range-finding image pickup units based on pixel output signal output from the range-finding image pickup units, respectively, a distance to the subject to be photographed can be obtained.

In the range-finding device using the triangulation system as described in Japanese Patent Application Publication No. 2002-90616, in order to perform range-finding with high accuracy, it is necessary that the range-finding image pickup units are accurately arranged at predetermined positions and arranged in a planar state so as to avoid angle deviation (inclination) on light receiving surfaces of the range-finding image pickup units.

Therefore, conventionally, during assembling the range-finding device, when the separately formed image pickup unit is arranged on a substrate, it is required to correct positional and angle deviations of the range-finding image pickup units to cause worsened work efficiency.

SUMMARY OF THE INVENTION

An object of an embodiment of the present invention is to provide a range-finding device capable of arranging range-finding image pickup units at predetermined positions with high accuracy and capable of avoiding angle deviation (inclination) on light-receiving surface of the range-finding image pickup units without operation for correcting positional and angle deviations of the range-finding image pickup units.

A range-finding device according to an embodiment of the present invention includes a plurality of two-dimensional image pickup units disposed at a predetermined interval with each other, a lens unit configured to form subject images of a subject on the plurality of image pickup units, the image pickup units on which the subject images are formed outputting signals of the subject images; and a distance calculation unit configured to calculate a distance to the subject based on the signals output from the image pickup units. The plurality of image pickup units are formed on a single substrate, the subject images are formed through the lens unit on at least two image pickup units of the plurality of image pickup units, and the distance calculation unit is configured to calculate a distance to the subject based on the signals output from the at least two image pickup units on each of which the subject image is formed.

DETAILED DESCRIPTION OF THE PREFERRED EMBODIMENTS

Hereinafter, preferred embodiments of the present invention will be explained with reference to the accompanied drawings.

First Embodiment

Example 1

Figure 1:
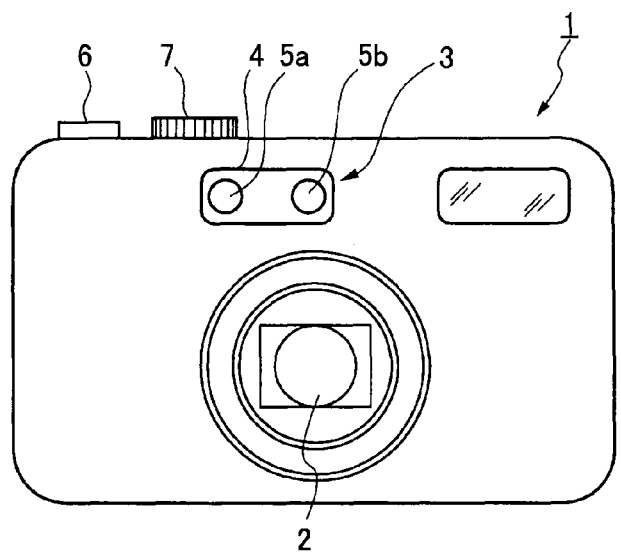
FIG. 1 is a front view showing a digital camera as an example of an imaging apparatus having a range-finding device according to Example 1.
Figure 2:
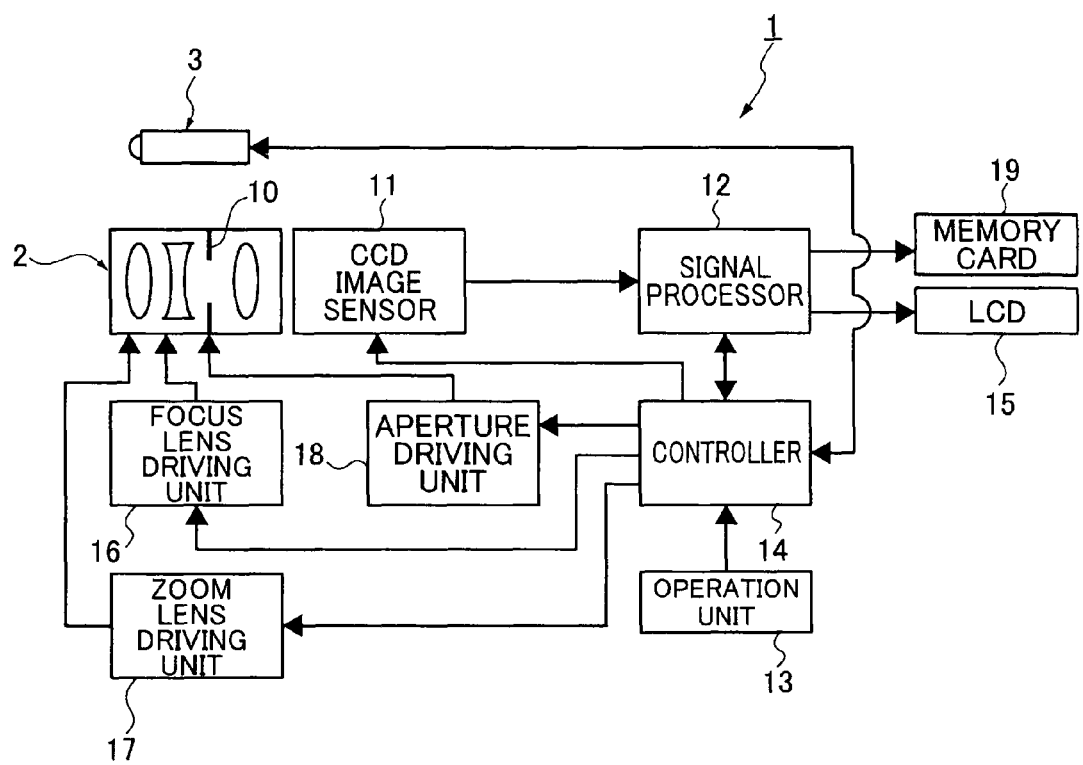
FIG. 2 is a block diagram schematically showing a system configuration of the digital camera according to Example 1.
Figure 3A:
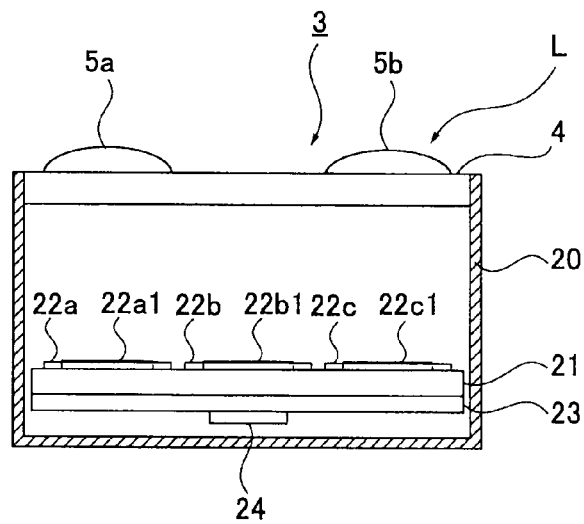
FIG. 3A is a schematic sectional view showing the range-finding device according to Example 1.
Figure 3B:
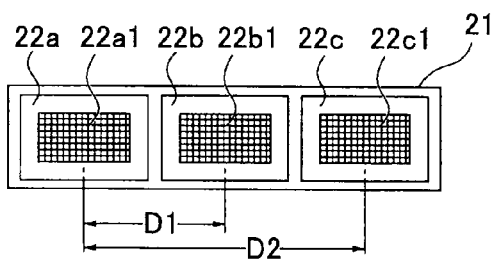
FIG. 3B is a plan view showing range-finding image pickup units of the range-finding device according to Example 1.

FIG. 1 is a front view showing a digital camera as an example of an imaging apparatus including a range-finding device according to Example 1 of the present invention, FIG. 2 is a block diagram schematically showing a system configuration of the digital camera shown in FIG. 1, FIG. 3A is a schematic longitudinal sectional view showing the range-finding device and FIG. 3B is a plain view showing image pickup units for range-finding.

(External Configuration of Digital Camera)

As shown in FIG. 1, at a front side of the digital camera 1 according to the Example of the present invention, a photographic lens 2 having high optical high magnification zoom function, a front side lens array 4 of the range-finding device 3 and the like are disposed. On a surface of the lens array 4, a pair of range-finding lenses 5a, 5b provided at an interval with each other in a right-left direction are integrally formed. The range-finding device 3 will be explained in detail later. The photographic lens 2 and the range-finding lenses 5a, 5b for the range finding have optical axes parallel to each other.

(System Configuration of Digital Camera 1)

As shown in FIG. 2, the digital camera 1 has the photographic lens 2 having a plurality of lens groups, an aperture stop unit 10 having a shutter function, a CCD image sensor 11 as a solid-state image pickup device which has a light receiving surface on which a subject image is formed through the photographic lens 2 and outputs a pixel output signal of the subject image as an electrical signal, a signal processor configured to perform digital processing on the pixel output signal output from the CCD image sensor 11, load the processed signal, and perform conversion processing on the processed signal into image data capable of being displayed and stored, a control unit 14 configured to perform entire system control of the digital camera 1 by using a control program stored in a not-illustrated ROM based on operation input information from an operation unit 13 (a release button 6, a photographic mode switching button 7 (see FIG. 1), and the like), a liquid crystal display monitor (LCD) 15 configured to display the image data generated in the signal processor 12, a focus lens driving unit 16 configured to drive focus lens groups of the photographic lens 2, a zoom lens driving unit 17 configured to drive zoom lens groups of the photographic lens 2, an aperture driving unit 18 configured to drive the aperture stop unit 10, the outer measurement range-finding device 3 configured to measure a distance to the subject, and the like. The image data generated in the signal processor 12 are stored in a removal memory card 19.

(Configuration of Range-Finding Device 3)

As shown in FIGS. 3A and 3B, the range-finding device 3 includes a plurality of two-dimensional range-finding image pickup units disposed at a predetermined interval with each other, a lens unit L configured to form subject images of a subject on the plurality of range-finding image pickup units, the range-finding image pickup units on which the subject images are formed outputting signals of the subject images, and a distance calculation unit configured to calculate a distance to the subject based on the signals output from the image pickup units. The plurality of range-finding image pickup units are formed on a single substrate. The subject images are formed through the lens unit L on at least two range-finding image pickup units of the plurality of range-finding image pickup units. The distance calculation unit is configured to calculate a distance to the subject based on the signals output from the at least two range-finding image pickup units on each of which the subject image is formed.

The lens unit L may have a lens array and a plurality of lenses integrally formed on the lens array and disposed so as to respectively face the plurality of range-finding image pickup units, and the plurality of lenses are two lenses arranged in a row so as to face two both side range-finding image pickup units of the plurality of range-finding image pickup units between which at least one range-finding image pickup unit is disposed.

More particularly, for example, the range-finding device 3 according to this Example includes a housing 20 having an opening at a front side (upper side of FIG. 3A), a lens array 4 formed by a transparent resin material with which the pair of range-finding lenses 5a, 5b are integrally formed at the front side of the housing in a row in the right-left direction of the digital camera, a thin-plate like substrate 21 for the image pickup units, which is disposed at a back side (lower side of FIG. 3A) of the housing 20, opposite to the lens array 4, three planar (two-dimensional) image pickup units 22a, 22b, 22c for range-finding, which are formed on the substrate 21 at predetermined intervals, and a circuit substrate 23 disposed at a back side of the substrate 21.

The both side image pickup units 22a, 22c of the three image pickup units 22a, 22b, 22c are disposed so as to face the range-finding lenses 5a, 5b, respectively. Imaging areas (light receiving surface) 22a1, 22b1, 22c1 of the image pickup units 22a, 22b, 22c have the same size each other. In this Example, a range-finding lens is not provided at a center part of the lens array 4 corresponding to the center image pickup unit 22b of the three image pickup units 22a, 22b, 22c so that the center part of the lens array 4 is in a shielded state. Accordingly, a pixel output signal is slightly or not output from the center image pickup unit 22b (imaging area 22b1) of the three image pickup units 22a, 22b, 22c.

The image pickup units 22a, 22b, 22c integrally provided on the substrate 21 are, for example, a CCD, CMOS, or the like integrally formed with a later described semiconductor wafer by a known semiconductor processing. In the imaging areas (light receiving surfaces) 22a1, 22b1, 22c1, a large number of light receiving elements (pixels) are arranged in a grid-like manner.

In this Example, as shown in FIG. 3B, for example, a length D1 of a base line between the imaging areas 22a1 and 22b1 of the adjacent image pickup units 22a, 22b is about 3 mm, and a length D2 of a base line between the imaging areas 22a1 and 22c1 of the both side image pickup units 22a, 22c is about 6 mm.

The optical axes of the range-finding lenses 5a, 5c are parallel to each other. Diagonal centers of the imaging areas 22a1, 22c1 of the both side image pickup units 22a, 22c are positioned so as to substantially coincide with the optical axes of the range-finding lenses 5a, 5b, respectively. Field angles of the range-finding lenses 5a, 5b are equal to each other.

Each of the range-finding lenses 5a, 5b has a focal length so as to form a subject image on the imaging area 22a1, 22c1 from a subject light entering the range-finding lenses 5a, 5b.

A range-finding calculation unit 24, and the like are provided on the circuit substrate 23 and is configured to load the pixel output signal output from each of the imaging area 22a1, 22c1 of the image pickup units 22a, 22c, calculate a deviation between the subject images formed on the imaging areas, that is, disparity, and calculate a distance to the subject.

The distance information calculated in the range-finding calculation unit 24 is output to the control unit 14. The control unit 14 outputs a driving control signal to the focus lens driving unit 16 so as to focus on the subject based on the input distance information.

Hereinafter, principle of range-finding in the range-finding device 3 will be explained.

Figure 4:
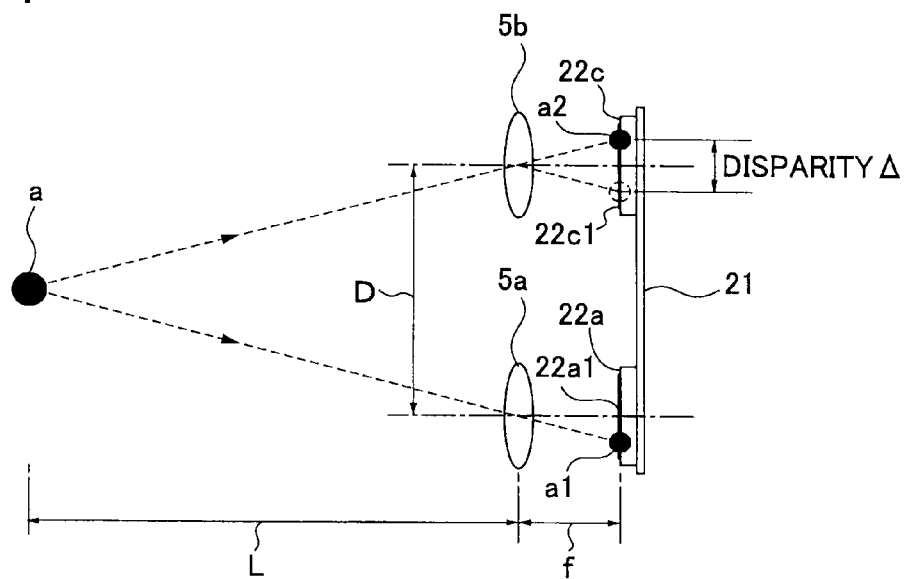
FIG. 4 is a schematic view explaining a range-finding principle in the range-finding device.

As shown in FIG. 4, a subject image a1 obtained through the range-finding lens 5a and a subject image a2 obtained through the range-finding lens 5b are formed on the imaging areas 22a1, 22c1 of the image pickup units 22a, 22c with disparity Δ at the same points on a subject "a", respectively and then received by the plurality of light receiving elements (pixels) to be converted into electric signals. In FIG. 4, the center image pickup unit 22b is omitted.

Under the assumption that the disparity is Δ, the distance between the optical axes of the range-finding lenses 5a, 5b, that is, the length of the base line is D, a distance between the range-finding lenses 5a, 5b and the subject a is L, and a focal length of the range-finding lenses 5a, 5b is f, if L>>f, the following equation (1) is obtained.

$$L = D \times f / \Delta \quad (1)$$

Since the values D and f are known, the range-finding calculation unit 24 calculates the disparity Δ from the pixel output signals output from pixels (light receiving element) of the imaging areas 22a1, 22c1 by the known calculation method so that the distance L between the range-finding lenses 5a, 5b and the subject a is calculated.

(Range-Finding Operation in Range-Finding Device 3)

Next, the range-finding operation by the range-finding device 3 when the subject is photographed by the digital camera 1 will be explained.

When a photographer turns on the not-illustrated power switch to set the digital camera in a photographing mode, a range-finding start command signal is output to the range-finding device 3. Light from the subject entering the pair of range-finding lenses 5a, 5b is imaged on the imaging areas 22a1, 22c1 of the image pickup units 22a, 22c to form the subject images, respectively.

Then, the range-finding calculation unit 24 loads the pixel output signals output from the imaging areas 22a1, 22c1 of the image pickup units 22a, 22c and calculate the deviation between the subject images formed on the imaging areas 22a1, 22c1, that is, disparity so that the distance to the subject can be calculated with high accuracy. The information of the calculated distance to the subject is output to the control unit 14.

The control unit 14 controls to drive the focal lens driving unit 16 based on the input distance information so as to move the focus lens groups of the photographic lens 2 to an in-focus position so that the subject image is formed on the light receiving surface of the CCD image sensor 11.

The signal processor 12 loads the pixel output signal output from each pixel of the CCD image sensor 11 and calculates a luminance of the subject based on intensity of the pixel output. The information of the calculated luminance of the subject is output to the control unit 14. Then, the control unit 14 sets an opened state, that is, an aperture value of the aperture stop unit 10 and a number of electrical shutter operations of the CCD image sensor 11 so as to be an appropriate exposure amount for the subject based on the input luminance information. The opened state of the aperture stop unit 10 is controlled by being driven by the aperture driving unit 18.

Then, the release button 6 is pressed, the subject is photographed in the in-focus state at the appropriate exposure condition including the number of the electric shutter operations of the CCD image sensor 11, the aperture value of the aperture stop unit 10, and the like. The signal processor 12 performs digital processing on the pixel output signal output from the CCD image sensor 11, loads the processed signal, and converts it into the image data capable of being displayed and recorded. The image data generated in the signal processor 12 is stored in the memory card 19 and displayed on the LCD monitor 15 as a still image.

Next, the image pickup units 22a, 22b, 22c of the range-finding device 3 will be explained in detail.

Figure 5:
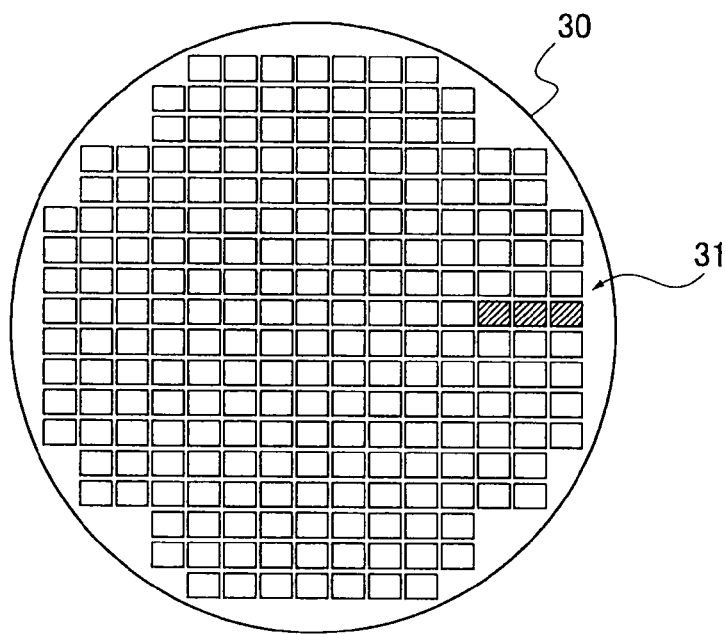
FIG. 5 is a plan view showing a plurality of image pickup units formed on a semiconductor wafer.

The substrate 21 for the image pickup units and the three image pickup units 22a, 22b, 22c are, as shown in FIG. 5, formed by forming a plurality of image pickup units 31 (imaging areas thereof are not illustrated) on a semiconductor wafer 30 by a known semiconductor processing and cutting out a set of three image pickup units disposed in a row (for example, three image pickup units shown as shaded parts) from the semiconductor wafer 30 to separate the set of three image pickup units together with the semiconductor wafer 30 from the plurality of image pickup units.

The plurality of the image pickup units 31 on the semiconductor wafer 30 are formed by performing patterning with a mask and therefore the cut out range-finding image pickup units 22a, 22b, 22c are arranged and positioned with high accuracy and pixel matrixes of three range-finding image pickup units 22a, 22b, 22c are parallel to each other. A surface of the semiconductor wafer 30 is planar with high accuracy and therefore normal lines of the three range-finding image pickup units 22a, 22b, 22c are necessarily parallel to each other.

Thereby, without operation for correcting a position gap or deviation and an angle gap or deviation of the image pickup units 22a, 22b, 22c, the image pickup units 22a, 22b, 22c can be arranged at the predetermined positions with high accuracy. Further, the image pickup units 22a, 22b, 22c can be disposed without occurrence of angle deviation or inclination in the light receiving surfaces of the image pickup units 22a, 22b, 22c. Accordingly, the distance to the subject can be stably measured with high accuracy.

Sizes of the image pickup units 22a, 22b, 22c of the range-finding device 3 according to this Example are significantly smaller than those of the image pickup unit of the CCD image sensor 11 for photographing the subject in the digital camera 1. Accordingly, as the image pickup units 22a, 22b, 22c of the range-finding device 3, for example, an image pickup unit for a camera module to be generally installed on a cell phone may be used.

The image pickup unit for the camera module of the cell phone is advantageously used in term of cost because it is mass-produced in factories and an image pickup unit having a VGA (640×480 pixels) size may be used with especially low cost. Accordingly, by cutting out the three image pickup units disposed in a row together with the semiconductor wafer on which a plurality of image pickup units each having, for example, VGA size are formed by the known semiconductor processing from the semiconductor wafer, as shown in FIG. 3B, the image pickup unit substrate 21 on which the three range-finding image pickup units are integrally formed can be easily obtained at a low cost. Thereby, low cost range-finding image pickup unit 3 can be provided.

In this Example, although the three image pickup units disposed in a row are cut out together with a part of the semiconductor wafer from the semiconductor wafer to separate the three image pickup units from a plurality of image pickup units formed on the semiconductor wafer so that the both side image pickup units are used as the range-finding image pickup units, it is not limited thereto. The four or five or more image pickup units disposed in a row may be cut out together with a part of the semiconductor wafer and separated from the plurality of image pickup units formed on the semiconductor wafer so that the both side range-finding image pickup units are used.

In this case, since a length of a base line between a pair of image pickup units can be increased, a distance to a subject at a great distance can be measured with high accuracy when the subject is photographed by zooming at a telephoto end side in the digital camera having an optical high magnification zoom function.

Example 2

Figure 6A:
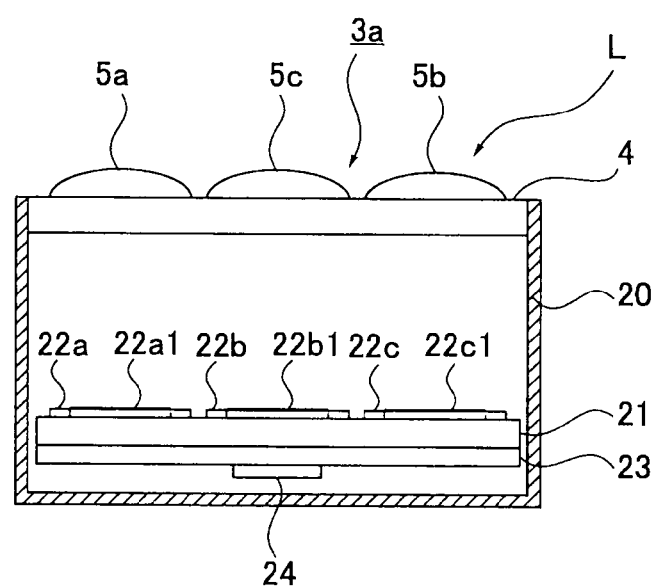
FIG. 6A is a schematic sectional view showing the range-finding device according to Example 2.
Figure 6B:
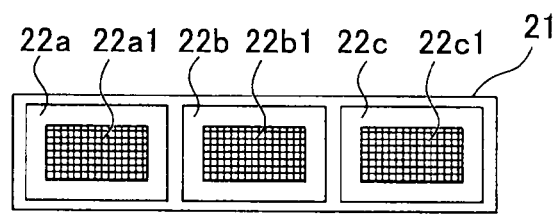
FIG. 6B is a plan view showing range-finding image pickup units of the range-finding device according to Example 2.

FIG. 6A is a schematic longitudinal sectional view showing the range-finding device according to Example 2, and FIG. 6B is a plain view showing the image pickup unit for range-finding. Same reference numbers are used for the same configurations as those of Example 1. Configurations of the digital camera using the range-finding device are same as or analogous to those of Example 1 shown in FIGS. 1 and 2 and therefore explanation will be omitted.

The lens unit L may have a lens array and a plurality of lenses integrally formed on the lens array and disposed so as to face the plurality of range-finding image pickup units, the plurality of lenses include a pair of first lenses disposed at a first distance therebetween and a pair of second lenses disposed at a second distance therebetween which is larger than the first distance, the subject images through the pair of first lenses and the pair of second lenses are formed on the range-finding image pickup units, and the distance calculation unit calculates the distance to the subject based on the signals output from the range-finding image pickup units on which the subject images are formed through the pair of the first lenses and the range-finding image pickup units on which the subject images are formed through the pair of the second lenses. The plurality of lenses may be three lenses formed on the lens array and disposed in a row and the pair of first lenses are two adjacent lenses and the pair of second lenses are two both side lenses.

As shown in FIGS. 6A and 6B, the range-finding device 3a according to this Example includes a housing 20 having an opening at a front side (upper side of FIG. 6A), a lens array 4 formed by a transparent resin material with which the three range-finding lenses 5a, 5b, 5c are integrally formed at the front side of the housing in a row in the right-left direction of the digital camera 1, a thin-plate like substrate 21 for the image pickup units, which is disposed at a back side (lower side of FIG. 6A) of the housing 20, opposite to the lens array 4, three planar (two-dimensional) image pickup units 22a, 22b, 22c for range-finding, which are integrally formed on the substrate 21 at predetermined intervals, and a circuit substrate 23 disposed at a back side of the substrate 21. As described above, in this Example, the range-finding lens 5c is provided between the two range-finding lenses 5a, 5b provided at both sides of the lens array 4.

The three image pickup units 22a, 22b, 22c are disposed so as to face the range-finding lenses 5a, 5c, 5b, respectively. The optical axes of the range-finding lenses 5a, 5c, 5b are parallel to each other. Diagonal centers of the imaging areas 22a1, 22b1, 22c1 of the three image pickup units 22a, 22b, 22c are positioned so as to substantially coincide with the optical axes of the range-finding lenses 5a, 5c, 5b, respectively. Each of the range-finding lenses 5a, 5c, 5b has a focal length so as to form a subject image on the imaging area 22a1, 22c1, 22b1 from a subject light entering the range-finding lenses 5a, 5c, 5b. Field angles of the range-finding lenses 5a, 5c, 5b are equal to each other.

The image pickup units 22a, 22b, 22c integrally formed on the substrate 21 are, similarly to Example 1 shown in FIG. 5, formed by cutting out the three image pickup units disposed in a row together with a part of the semiconductor wafer on which a plurality of image pickup units are formed by a known semiconductor process to separate the three image pickup units from the plurality of image pickup units formed on the semiconductor wafer.

A range-finding calculation unit 24, and the like are provided on the circuit substrate 23 and is configured to load the pixel output signal output from each of the imaging area of the selected two image pickup units 22a, 22c from the three image pickup units 22a, 22b, 22c (in this Example, both side image pickup units 22a, 22c are selected in a case of normal range finding and adjacent image pickup units 22a, 22b are selected in a case of range finding with a close distance), calculate a deviation between the subject images formed on the imaging areas, that is, disparity, and calculate a distance to the subject.

(Range-Finding Operation in Range-Finding Device 3a)

Next, the range-finding operation by the range-finding device 3a when the subject is photographed by the digital camera 1 will be explained.

When a photographer turns on the not-illustrated power switch to set the digital camera in a photographing mode, a range-finding start command signal is output to the range-finding device 3a. Light from the subject entering the three range-finding lenses 5a, 5c, 5b is imaged on the imaging areas 22a1, 22c1, 22b1 of the image pickup units 22a, 22c, 22b to form the subject images, respectively.

Figure 7A:
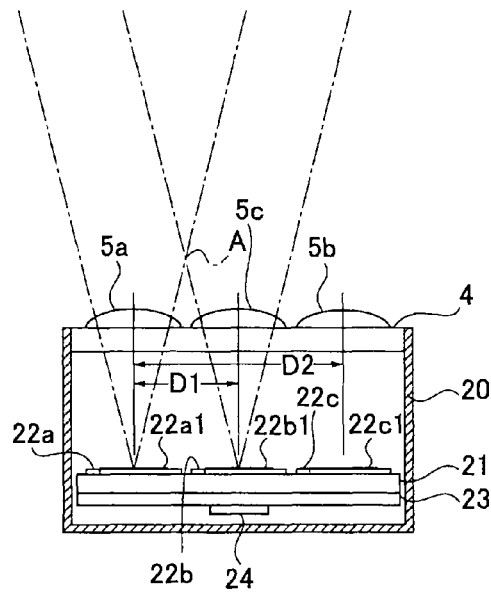
FIG. 7A is a view explaining a range-finding in a case where a subject is at a closer position in the range-finding device according to Example 2.

At this time, as shown in FIG. 7A, a length D1 of a base line between the adjacent image pickup units 22a, 22b is smaller than a length D2 of a base line between the both side image pickup units 22a, 22c and therefore, due to the deviation between the subject images formed on the imaging areas 22a1, 22b1, that is, disparity, the distance to the vicinity of a position A at a close side can be measured with high accuracy.

Figure 7B:
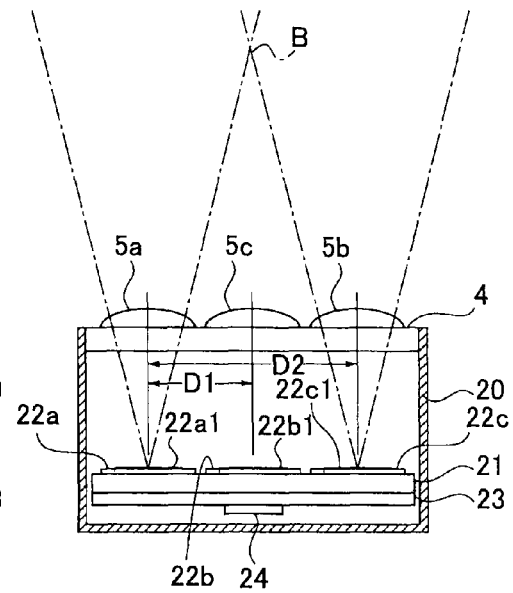
FIG. 7B is a view explaining a range-finding in a case where the subject is at a more distant position than the closer position in the range-finding device according to Example 2.

As shown in FIG. 7B, since the length D2 of the base line between the both side image pickup units 22a, 22c is longer than the length D1 of the base line between the two adjacent image pickup units 22a, 22b, although the distance to the subject at a position closer than a position B (position B>position A) cannot be measured with high accuracy, the distance to the subject at a position more distant than the position B can be measured with high accuracy by the deviation between the subject images formed on the imaging areas 22a1, 22c1, that is, disparity.

For example, in a case where the subject is at a closer position, that is, a position between the position A and the position B, as shown in FIGS. 7A, 7B, the pixel output signals output from the imaging areas 22a1, 22b1 of the image pickup units 22a, 22b are loaded and the deviation between the subject images formed on the imaging areas 22a1, 22b1, that is, disparity is calculated so that the distance to the subject can be calculated with high accuracy. The information of the distance to the subject is output to the control unit 14.

For example, in a case where the subject is at a distant position from a close position, that is, a position more distant than the position B, as shown in FIG. 7B, the pixel output signals output from the imaging areas 22a1, 22c1 of the image pickup units 22a, 22c are loaded and the deviation between the subject images formed on the imaging areas 22a1, 22c1, that is, disparity is calculated so that the distance to the subject can be calculated with high accuracy. The information of the distance to the subject is output to the control unit 14.

The control unit 14 controls to drive the focal lens driving unit 16 based on the input distance information so as to move the focus lens groups of the photographic lens 2 to an in-focus position so that the subject image is formed on the light receiving surface of the CCD image sensor 11.

As described above, according to the digital camera 1 having the range-finding device 3a of this Example, in a case where the subject is at a close position, the range-finding is performed based on the pixel output signals output from the imaging areas 22a1, 22b1 of the two adjacent image pickup units 22a, 22b having the short length of the base line therebetween. In a case where the subject is at a position more distant than a close position, the range-finding is performed based on the pixel output signals output from the imaging areas 22a1, 22c1 of the both side image pickup units 22a, 22c having the large length of the base line therebetween.

Accordingly, if the subject is at a closer position, the distant to the subject can be measured with high accuracy.

In this Example, similarly to Example 1, by cutting out the three image pickup units disposed in a row together with the semiconductor wafer on which a plurality of image pickup units each having, for example, VGA size are formed by the known semiconductor processing from the semiconductor wafer, as shown in FIG. 6B, the image pickup unit substrate 21 on which the three range-finding image pickup units are integrally formed can be easily obtained at a low cost.

Thereby, without operation for correcting a position gap or deviation and an angle gap or deviation of the image pickup units 22a, 22b, 22c, the image pickup units 22a, 22b, 22c are arranged at the predetermined positions with high accuracy. Further, the image pickup units 22a, 22b, 22c can be disposed without occurrence of angle deviation or inclination in the light receiving surfaces of the image pickup units 22a, 22b, 22c. Accordingly, the distance to the subject can be stably measured with high accuracy.

Example 3

Figure 8A:
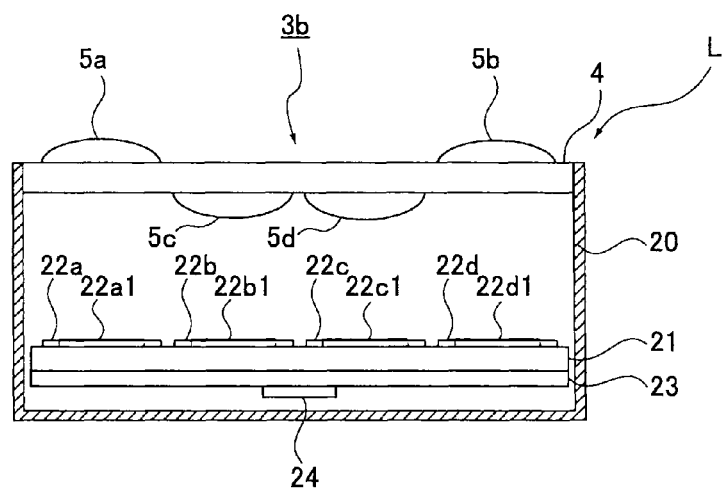
FIG. 8A is a schematic sectional view showing the range-finding device according to Examples 3 and 4.
Figure 8B:
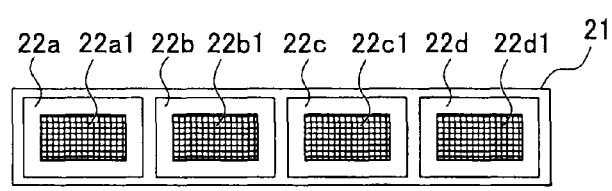
FIG. 8B is a plan view showing range-finding image pickup units of the range-finding device according to Examples 3 and 4.

FIG. 8A is a schematic longitudinal sectional view showing the range-finding device according to Example 3, and FIG. 8B is a plain view showing the image pickup unit for range-finding. Same reference numbers are used for the same configurations as those of Examples 1 and 2. Configurations of the digital camera using the range-finding device are same as or analogous to those of Example 1 shown in FIGS. 1 and 2 and therefore explanation will be omitted.

The plurality of lenses may be four lenses formed on the lens array in a row, and the pair of first lenses are two inward lenses of the four lenses and the pair of second lenses are two both side lenses. The two inward lenses may be formed at a rear surface of the lens array and the two both side lenses are formed at a front side of the lens array.

Although in Example 2, the range-finding device includes three range-finding lenses and three image pickup units, the range-finding device 3b according to this Example includes, as shown in FIG. 8A, four range-finding lenses 5a, 5b, 5c, 5d arranged in a row and four image pickup units 22a, 22b, 22c, 22d.

Two range-finding lenses 5a, 5b are integrally formed on the lens array 4 at both sides of the lens array 4 at the front side (upper side of FIG. 8A) and two range-finding lenses 5c, 5d are integrally formed on the lens array 4 at inward sides between the front both side range-finding lenses 5a, 5b at the back side of the lens array 4 (lower side of FIG. 8A). Optical axes of the four range-finding lenses 5a, 5c, 5d, 5b are parallel to each other. Diagonal centers of the imaging areas 22a1, 22b1, 22c1, 22d1 of the four image pickup units 22a, 22b, 22c, 22d are positioned so as to substantially coincide with the optical axes of the range-finding lenses 5a, 5c, 5d, 5b, respectively.

The front side range-finding lenses 5a, 5b and the back side range-finding lenses 5c, 5d of the lens array 4 are set so as to have focal lengths to form images on the corresponding imaging areas 22a1, 22d1, 22b1, 22c1 in the same plane from subject light entering the range-finding lenses 5a, 5b, 5c, 5d. That is, since the two both side range-finding lenses 5a, 5b are positioned at a front side from the inward side range-finding lenses 5c, 5d, the focal lengths of the range-finding lenses 5a, 5b are set to be larger than those of the range-finding lenses 5c, 5d.

Field angles of the two inward side lenses 5c, 5d are set to be wider than those of the both side range-finding lenses 5a, 5b.

The four range-finding image pickup units 22a, 22b, 22c, 22d (imaging areas 22a1, 22b1, 22c1, 22d1), similarly to Example 1, can be obtained by cutting out the four image pickup units disposed in a row together with the semiconductor wafer on which a plurality of image pickup units each having, for example, VGA size are formed by the known semiconductor processing from the semiconductor wafer, as shown in FIG. 8B.

(Range-Finding Operation in Range-Finding Device 3b)

Next, the range-finding operation by the range-finding device 3b when the subject is photographed by the digital camera 1 will be explained.

When a photographer turns on the not-illustrated power switch to set the digital camera in a photographing mode, a range-finding start command signal is output to the range-finding device 3b. Light from the subject entering the four range-finding lenses 5a, 5c, 5d, 5b is imaged on the imaging areas 22a1, 22b1, 22c1, 22d1 of the image pickup units 22a, 22b, 22c, 22d to form the subject images, respectively.

Figure 9A:
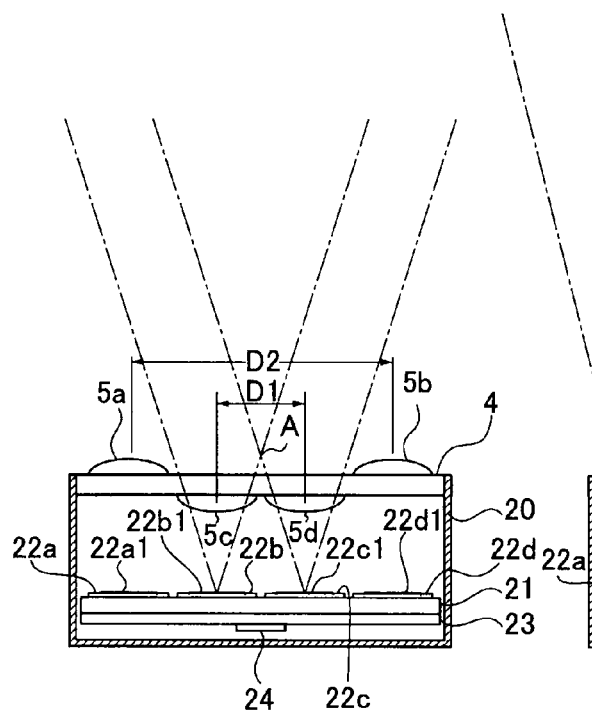
FIG. 9A is a view explaining a range-finding in a case where the subject is at a closer position in the range-finding device according to Example 3.

At this time, as shown in FIG. 9A, a length D1 of a base line between the two inward side image pickup units 22b, 22c (imaging areas 22b1, 22c1) is smaller than a length D2 of a base line between the both side image pickup units 22a, 22d (imaging areas 22b1, 22c1) and therefore, due to the deviation between the subject images formed on the inward side imaging areas 22b1, 22c1, that is, disparity, the distance to the vicinity of a position A at a close side can be measured with high accuracy.

Figure 9B:
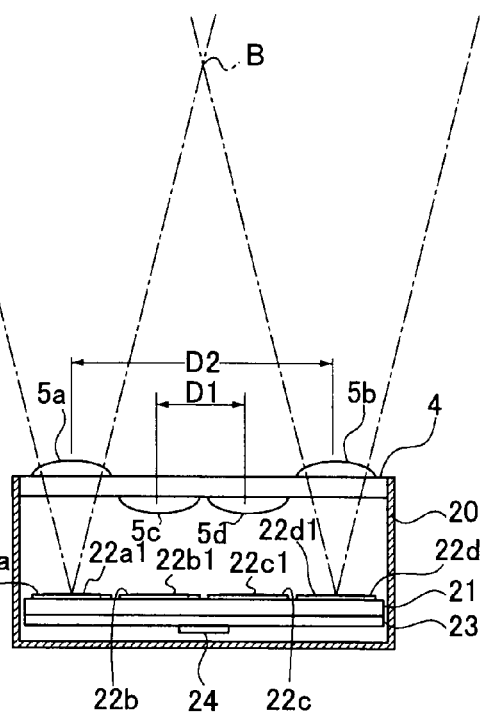
FIG. 9B is a view explaining a range-finding in a case where the subject is at a more distant position than the closer position in the range-finding device according to Example 3.

As shown in FIG. 9B, since the length D2 of the base line between the both side image pickup units 22a, 22d (imaging areas 22a1, 22d1) is longer than the length D1 of the base line between the two inward side image pickup units 22b, 22c (imaging areas 22b1, 22c1), although the distance to the subject at a position closer than a position B (position B>position A) cannot be measured with high accuracy, the distance to the subject at a position more distant than the position B can be measured with high accuracy by the deviation between the subject images formed on the imaging areas 22a1, 22d1, that is, disparity.

For example, in a case where the subject is at a closer position, that is, a position between the position A and the position B, as shown in FIGS. 9A, 9B, the pixel output signals output from the imaging areas 22b1, 22c1 of the image pickup units 22b, 22c are loaded and the deviation between the subject images formed on the imaging areas 22b1, 22c1, that is, disparity is calculated so that the distance to the subject can be calculated with high accuracy. The information of the distance to the subject is output to the control unit 14.

For example, in a case where the subject is at a distant position from a close position, that is, a position more distant than the position B, as shown in FIG. 9B, the pixel output signals output from the imaging areas 22a1, 22d1 of the image pickup units 22a, 22d are loaded and the deviation between the subject images formed on the imaging areas 22a1, 22d1, that is, disparity is calculated so that the distance to the subject can be calculated with high accuracy. The information of the distance to the subject is output to the control unit 14.

The control unit 14 controls to drive the focal lens driving unit 16 based on the input distance information so as to move the focus lens groups of the photographic lens 2 to an in-focus position so that the subject image is formed on the light receiving surface of the CCD image sensor 11.

As described above, according to the digital camera 1 having the range-finding device 3b of this Example, in a case where the subject is at a close position, the range-finding is performed based on the pixel output signals output from the imaging areas 22b1, 22c1 of the two inward side image pickup units 22b, 22c having the short length of the base line therebetween. In a case where the subject is at a position more distant than a close position, the range-finding is performed based on the pixel output signals output from the imaging areas 22a1, 22d1 of the both side image pickup units 22a, 22d having the large length of the base line therebetween.

Accordingly, if the subject is at a closer position, the distant to the subject can be measured with high accuracy.

In this Example, similarly to Example 1, by cutting out the four image pickup units disposed in a row together with the semiconductor wafer on which a plurality of image pickup units each having, for example, VGA size are formed by the known semiconductor processing from the semiconductor wafer, as shown in FIG. 8B, the image pickup unit substrate 21 on which the four range-finding image pickup units are integrally formed can be easily obtained at a low cost.

Thereby, without operation for correcting a position gap or deviation and an angle gap or deviation of the image pickup units 22a, 22b, 22c, 22d, the image pickup units 22a, 22b, 22c, 22d are arranged at the predetermined positions with high accuracy. Further, the image pickup units 22a, 22b, 22c, 22d can be disposed without occurrence of angle deviation or inclination in the light receiving surfaces of the image pickup units 22a, 22b, 22c, 22d. Accordingly, the distance to the subject can be stably measured with high accuracy.

Example 4

Figure 10A:
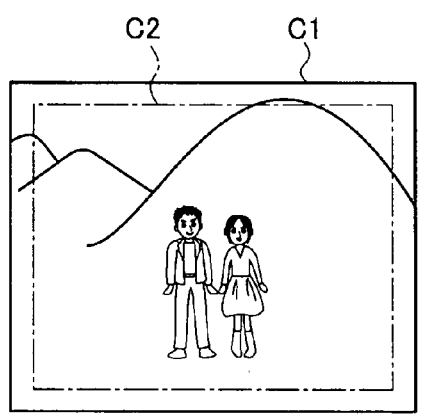
FIG. 10A is a view showing an example of a range-finding field angle in the range-finding device according to Example 4 and a photographing field angle when zooming to a wide angle side is performed.
Figure 10B:
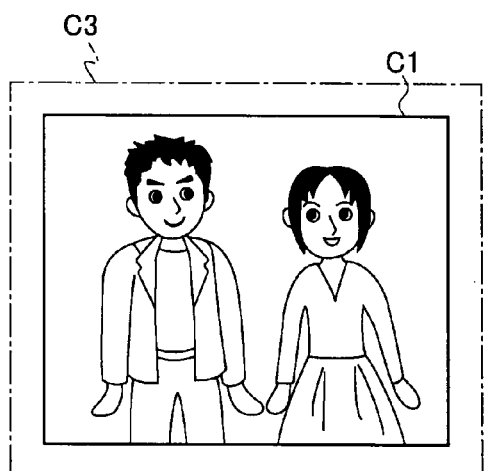
FIG. 10B is a view showing an example of a range-finding field angle in the range-finding device according to Example 4 and a photographing field angle when zooming to a telephoto side is performed.

Since in the digital camera 1, the photographic lens 2 has a zoom lens group, if, for example, the photographic lens 2 has a zoom function of an optical high magnification of 28 to 300 mm (35 mm equivalent), for example, as shown in FIGS. 10A, 10B, the photographing field angle (part C1 surrounded by a solid line) is changed between the most wide angle side (FIG. 10A) and the most telephoto side (FIG. 10B). In FIGS. 10A and 10B, the subject is two persons at a center.

As described above, in the digital camera 1 having the optical high magnification zoom function, the field angle when photographing at the most angle wide side is largely changed from the most telephoto side. On the other hand, in the conventional range-finding device having configuration in which a pair of (two) range-finding lenses are disposed so as to face the image pickup units, the field angle of the range-finding lenses is set to a field angle at telephoto side of, for example, 100 mm (35 mm equivalent) intermediate between 28 to 300 mm so as to be adjusted to the photographing field angle which changes in accordance with a zoom magnification ratio.

Therefore, although, if the photographing field angle is around 100 mm (35 mm equivalent), the range-finding can be performed with high accuracy, if zooming is performed for photographing such that the photographing field angle is around a most wide angle side (28 mm (35 mm equivalent)) or around a most telephoto side (300 mm (35 mm equivalent)), deviation between a range-finding field angle and a photographing field angle is increased so that accuracy in the range-finding is reduced.

Therefore, in this Example, in the range-finding device 3b according to Example 3 shown in FIGS. 8A, 9A, 9B, field angles of the two inward side range-finding lenses 5c, 5d of the four range-finding lenses 5a, 5b, 5c, 5d are set so as to be field angles of the wide angle range-finding of, for example, equivalent to 50 mm (35 mm equivalent) (see, for example, a range C2 shown by a dashed line in FIG. 10A). Field angles of the both side range-finding lenses 5a, 5b of the four range-finding lenses 5a, 5b, 5c, 5d are set so as to be field angles of the telephoto range-finding of, for example, equivalent to 150 mm (35 mm equivalent) (see, for example, a range C3 shown by a dashed line in FIG. 10B). Other configurations are the same as those of Example 3. That is, the field angle of the inward range-finding lenses 5c, 5d are set to be larger than those of the both side range-finding lenses 5a, 5b.

If the photographing field angle of the photographic lens 2 of the digital camera 1 shown in FIGS. 1 and 2 is set to be, for example, about 28 to 100 mm (35 mm equivalent), the range-finding calculation unit 24 loads pixel output signal from the imaging areas 22b1, 22c1 corresponding to the two inward range-finding lenses 5c, 5d which are set to have wide angle field angles, in accordance with the photographing field angle information input from the controller 14 and then the range-finding is performed based on the pixel output signal input in the same way. Then, the control unit 14 controls to drive the focal lens driving unit 16 based on the input distance information so as to move the focus lens groups of the photographic lens 2 to an in-focus position so that the subject image is formed on the light receiving surface of the CCD image sensor 11.

If the photographing field angle of the photographic lens 2 is set to be, for example, about 100 to 300 mm (35 mm equivalent), the range-finding calculation unit 24 loads pixel output signal from the imaging areas 22a1, 22d1 corresponding to the both side range-finding lenses 5a, 5b which are set to have telephoto field angles, in accordance with the photographing field angle information input from the controller 14 and then the range-finding is performed based on the pixel output signal input in the same way. Then, the control unit 14 controls to drive the focal lens driving unit 16 based on the input distance information so as to move the focus lens groups of the photographic lens 2 to an in-focus position so that the subject image is formed on the light receiving surface of the CCD image sensor 11.

As described above, according to the range-finding device of this Example, the field angles of the two inward range-finding lenses 5c, 5d of the four range-finding lenses 5a, 5b, 5c, 5d are set to wide angle range-finding field angles and the field angles of the two both side range-finding lenses 5a, 5b are set to telephoto range-finding field angles. Thereby, even if the photographic lens 2 has a wide photographing field angle of, for example, 28 to 300 mm (35 mm equivalent), the range-finding field angle can be set to the wide angle or telephoto range-finding field angle in accordance with the range-finding field angle set when photographing, so that the deviation between the photographing field angle and the range-finding field angle can be reduced and range-finding can be performed with high accuracy.

Example 5

Figure 11A:
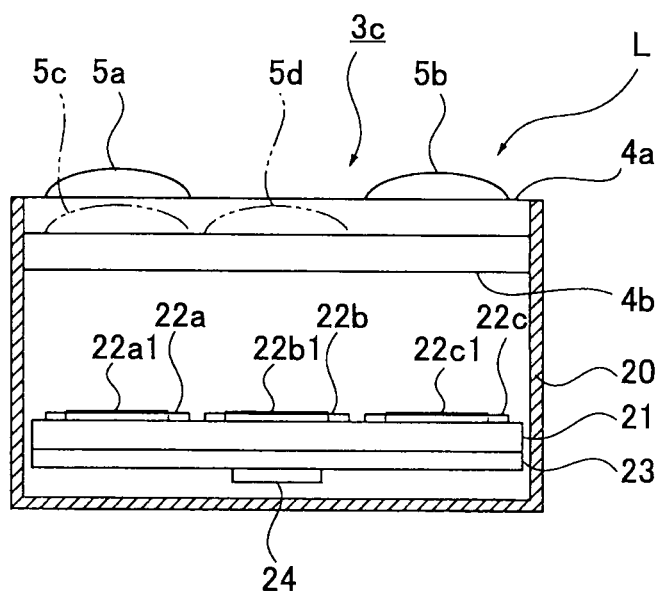
FIG. 11A is a schematic sectional view showing the range-finding device according to Example 5.
Figure 11B:
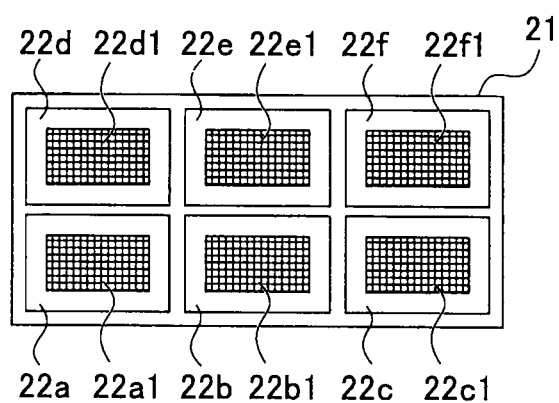
FIG. 11B is a plan view showing range-finding image pickup units of the range-finding device according to Example 5.

FIG. 11A is a schematic sectional view showing the range-finding device according to Example 5, and FIG. 11B is a plain view showing the image pickup unit for range-finding. Configurations of the digital camera using the range-finding device are same as or analogous to those of Example 1 shown in FIGS. 1 and 2 and therefore explanation will be omitted.

The following configurations may be used: the lens array has first and second lens array sections, the pair of first lenses are integrally formed on the first lens array section and the pair of second lenses are integrally formed on the second lens array section, and the second lens array section is disposed adjacent to a longitudinal side surface of the first lens array section and the second lens array section is disposed so as to be projected from the first lens array section toward an opposite side to the range-finding image pickup units to form a step portion.

The range-finding image pickup units may be formed by cutting out two rows each having at least three image pickup units together with the part of the semiconductor wafer so as to face the disposed first and second lens array sections.

Figure 12A:
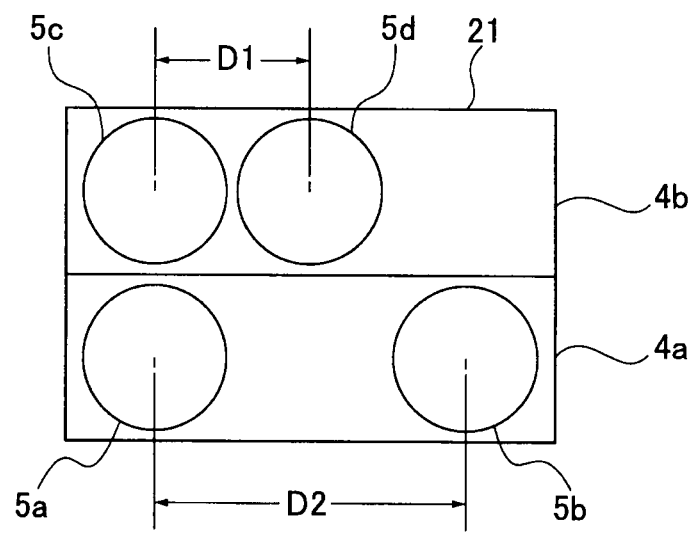
FIG. 12A is a schematic sectional view showing the range-finding device according to Example 5.
Figure 12B:
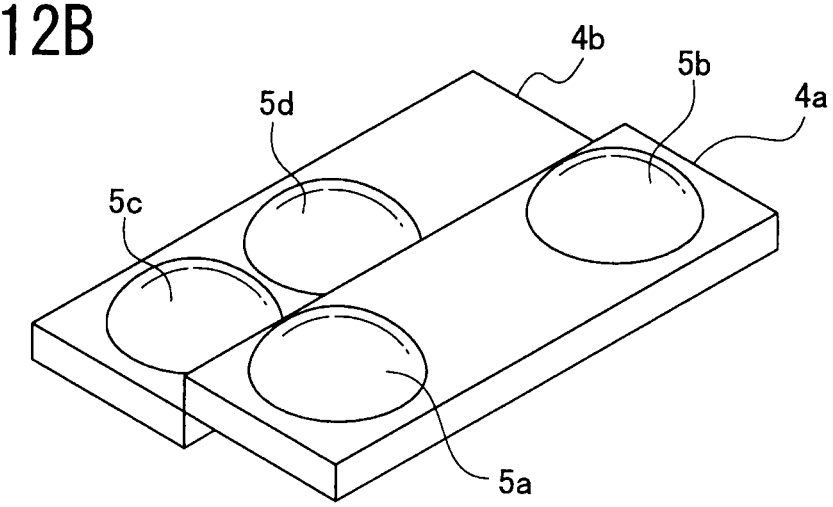
FIG. 12B is a plan view showing range-finding lenses of the range-finding device according to Example 5.

Although in Example 3, the range-finding device includes four range-finding lenses 5a, 5b, 5c, 5d which are arranged in a row and four image pickup units 22a, 22b, 22c, 22d, the range-finding device 3c according to this Example includes, as shown in FIGS. 11A, 12A, 12B, two range-finding lenses 5a, 5b are integrally formed on an upper surface of a first lens array 4a made by a transparent resin material and at both sides thereof, two range-finding lenses 5c, 5d are integrally formed on an upper surface of a second lens array 4b made by a transparent resin material at adjacent left and center sides thereof, and each of the first and second lens arrays 4a, 4b are disposed at an opened front side of the housing 20 (upper side of FIG. 11A) at different levels. As shown in FIGS. 12A and 12B, the first lens array 4a is disposed so as to have substantially contact with an upper edge of a longitudinal side surface of the second lens array 4b.

As shown in FIG. 11B, the image pickup unit substrate 21 on which six range-finding image pickup units 22a, 22b, 22c, 22d, 22e, 22f (imaging areas 22a1, 22b1, 22c1, 22d1, 22e1, 22f1) are formed so as to face the first and second lens arrays 4a, 4b is disposed on a back side of the housing 20 (lower side of FIG. 11A).

On the image pickup unit substrate 21, three range-finding image pickup units 22a, 22b, 22c and three range-finding image pickup units 22d, 22e, 22f are arranged at two rows. The image pickup units 22a, 22b, 22c (imaging areas 22a1, 22b1, 22c1) and the image pickup units 22d, 22e, 22f (imaging areas 22d1, 22e1, 22f1) which are arranged in two rows are obtained, for example, by cutting out the two rows of the three image pickup units (six image pickup units in total) together with a part of the semiconductor wafer on which a plurality of image pickup units each having, for example, a VGA size are formed by a known semiconductor processing from the semiconductor wafer, similarly to Example 1.

Optical axes of the four range-finding lenses 5a to 5b are parallel to each other. Diagonal centers of the imaging areas 22a1, 22c1, 22d1, 22e1 of the four image pickup units 22a, 22c, 22d, 22e are positioned so as to substantially coincide with the optical axes of the range-finding lenses 5a, 5c, 5d, 5b, respectively.

The range-finding lens is not provided at a center portion of the first lens array 4a between the range-finding lenses 5a and 5b and at a right side of the second lens array 4b so that the center part of the lens array 4 and the right side of the second lens array 4b are in a shielded state. Accordingly, a pixel output signal is not output from the center range-finding image pickup unit 22b and the right range-finding image pickup unit 22f of the six range-finding image pickup units 22a, 22b, 22c, 22d, 22e, 22f.

The range-finding lenses 5a, 5b of the lens array 4 are set so as to have focal lengths to form images on the corresponding imaging areas 22a1, 22c1 in the same plane from subject light entering the range-finding lenses 5a, 5b. Similarly to the above, the range-finding lenses 5c, 5d of the second lens array 4b are set so as to have focal lengths to form images from subject light entering the range-finding lenses 5c, 5d on the corresponding imaging areas 22d1, 22e1 in the same plane. That is, since the first lens array 4a is positioned at a front side from the second lens array 4b, the focal lengths of the range-finding lenses 5a, 5b are set to be larger than those of the range-finding lenses 5c, 5d.

Field angles of the range-finding lenses 5c, 5d of the second lens array 4b are set to be wider than those of the range-finding lenses 5a, 5b of the first lens array 4a.

In this Example, similarly to Example 3, when a photographer turns on the not-illustrated power switch to set the digital camera in a photographing mode, a range-finding start command signal is output to the range-finding device 3c from the control unit 14. Light from the subject entering the four range-finding lenses 5a, 5c, 5d, 5b is imaged on the imaging areas 22a1, 22c1, 22d1, 22e1 of the image pickup units 22a, 22c, 22d, 22e to form the subject images, respectively.

At this time, as shown in FIG. 12A, a length D1 of a base line between the image pickup lenses 5c, 5d (imaging areas 22d1, 22e1) of the second lens array 4b is smaller than a length D2 of a base line between the range-finding lenses 5a, 5b (imaging areas 22a1, 22c1) of the first lens array and therefore, range-finding at a closer position can be performed with high accuracy.

Therefore, in a case where the subject is at a closer position, the range-finding unit 24 loads the pixel output signals output from the imaging areas 22d1, 22e1 of the image pickup units 22d, 22e and calculates the deviation between the subject images formed on the imaging areas 22d1, 22e1, that is, disparity so that the distance to the subject can be calculated with high accuracy. The information of the distance to the subject is output to the control unit 14.

The length D2 of the base line between the range-finding lenses 5a and 5b (imaging areas 22a1, 22c1) of the first lens array 4a is larger than the Length D1 of the base line between the range-finding lenses 5c and 5d (imaging areas 22d1, 22e1) of the second lens array 4b. Accordingly, by calculating the deviation between the subject images formed on the imaging areas 22a1, 22c1, that is, disparity, the range-finding from a close position to a distant position can be performed with high accuracy. Information of the calculated distant to the subject is output to the control unit 14.

As described above, in the range-finding device 3c according to this Example, even if the subject is around a close position, the range-finding can be performed based on the pixel output signals output from the imaging areas 22d1, 22e1 corresponding to the range-finding lenses 5c, 5d of the second lens array 4b having a short base line with high accuracy.

In the range-finding device 3c according to this Example, since the first lens array 4a and the second lens array 4b are separately formed, positions of the first and second lens arrays 4a, 4b can be independently or separately set. Thereby, a size of the imaging area, and an optimal focal length of the range-finding lens in accordance with a length of the base line in the range-finding lenses 5a, 5b can be adjusted independently or separately from those in the range-finding lenses 5c, 5d.

Similarly to Example 1, in this Example, by cutting out six image pickup units disposed in two rows together with a part of the semiconductor wafer from the semiconductor wafer on which a plurality of image pickup units each having, for example, a VGA size are formed by the known semiconductor processing, as shown in FIG. 11B, the image pickup unit substrate 21 on which the range-finding image pickup units 22a, 22b, 22c and the range-finding image pickup units 22d, 22e, 22f which are integrally formed in two rows is easily formed with low cost.

Thereby, without operation for correcting a position gap or deviation and an angle gap or deviation of the range-finding image pickup units 22a, 22b, 22c and the range-finding image pickup units 22d, 22e, 22f which are arranged in two rows, the range-finding image pickup units 22a, 22b, 22c and the range-finding image pickup units 22d, 22e, 22f can be arranged at the predetermined positions with high accuracy. Further, the range-finding image pickup units 22a, 22b, 22c and the range-finding image pickup units 22d, 22e, 22f can be disposed without occurrence of angle deviation or inclination in the light receiving surfaces of the range-finding image pickup units 22a, 22b, 22c and the range-finding image pickup units 22d, 22e, 22f. Accordingly, the distance to the subject can be stably measured with high accuracy.

According to the range-finding device and the imaging apparatus, each of a plurality of range-finding image pickup units is a two dimensional image pickup unit on which light receiving elements are disposed in a planar state and obtained by cutting out at least three image pickup units together with a part of the semiconductor wafer from the semiconductor wafer on which a plurality of image pickup units to separate the three image pickup units from the plurality of image pickup units. Thereby, without operation for correcting positional and angle deviation of the range-finding image pickup units, the range-finding image pickup units are positioned at the predetermined positions with high accuracy. Furthermore, the range-finding image pickup units are disposed without angle deviation (inclination) on the light receiving surface of the range-finding image pickup unit so that distance to the subject can be stably measured with high accuracy.

Second Embodiment

The center range-finding image pickup unit in the range-finding device according to Example 1 may be used for removing the later-described flare.

Example 6

Configuration of Range-Finding Device 3

The range-finding device may include a light amount detection unit such as the later described flare amount detection unit, configured to detect a light amount when unnecessary light enters at least one non-image forming image pickup unit of the plurality of range-finding image pickup units through the lens unit L. When the unnecessary light enters the at least one non-image-forming image pickup unit, the light amount detection unit detects a light amount of the unnecessary light entering the at least one non-image forming image pickup unit. The distance calculation unit subtracts the output of the light amount of the unnecessary light detected by the light amount detection unit from the output from the range-finding image pickup units to correct the output from the range-finding image pickup units before calculating a distance to the subject based on the output from the range-finding image pickup units.

Furthermore, the following configurations may be used: when first and second unnecessary lights enter the at least one non-image-forming image pickup unit, an imaging area of the at least one non-image forming image pickup unit is divided into a first area including an area which the first unnecessary light enters and a second area including an area which the second unnecessary light enters, the light amount detection unit detects a light amount of the first unnecessary light from the first area and a light amount of the second unnecessary light from the second area, and the distance calculation unit subtracts the output of the light amount of the first unnecessary light detected by the light amount detection unit from the output from one of the range-finding image pickup units and subtracts the output of the light amount of the second unnecessary light detected by the light amount detection unit from the output from another one of the range-finding image pickup units to correct the output from the range-finding image pickup units before calculating a distance to the subject based on the output from the range-finding image pickup units.

Figure 13A:
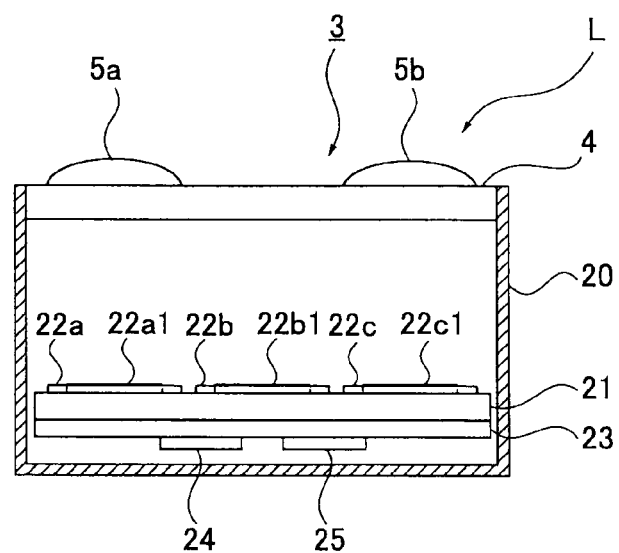
FIG. 13A is a schematic sectional view showing the range-finding device according to Examples 6 and 7.
Figure 13B:
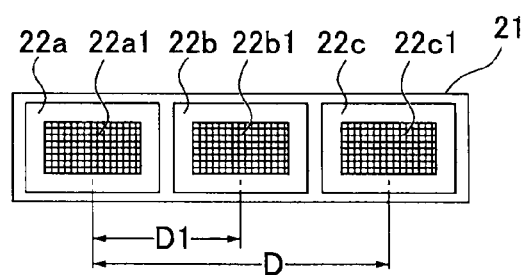
FIG. 13B is a plan view showing range-finding image pickup units of the range-finding device according to Examples 6 and 7.
Figure 14:
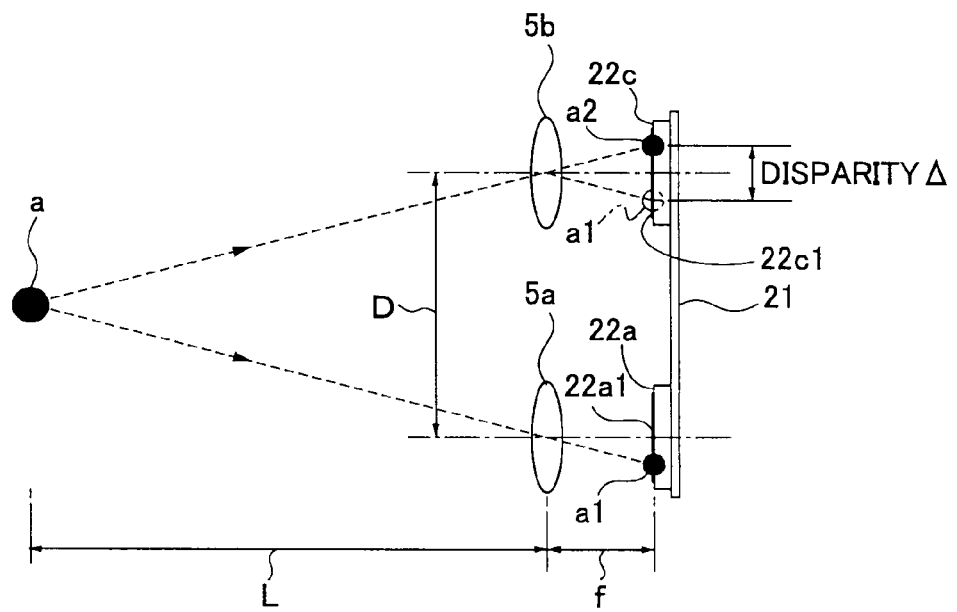
FIG. 14 is a schematic view explaining a range-finding principle in the range-finding device.

More particularly, for example, as shown in FIGS. 13A and 13B, the range-finding device 3 according to this Example includes a housing 20 having an opening at a front side (upper side of FIG. 13A), a lens array 4 formed by a transparent resin material with which the pair of range-finding lenses 5a, 5b are integrally formed at the front side of the housing 20 in a row in the right-left direction of the digital camera 1, a thin-plate like substrate 21 for the image pickup units, which is disposed at a back side (lower side of FIG. 13A) of the housing 20, opposite to the lens array 4, three planar (two-dimensional) image pickup units 22a, 22b, 22c for range-finding, which are formed on the substrate 21 at predetermined intervals, and a circuit substrate 23 disposed at a back side of the substrate 21. Hereinafter, the both side image pickup units 22a, 22c are referred to as the range-finding image pickup units and the center image pickup unit 22b is referred to as non-image forming image pickup unit 22b.

The both side image pickup units 22a, 22c are disposed so as to face the range-finding lenses 5a, 5b, respectively. Imaging areas (light receiving surface) 22a1, 22c1 of the both side range-finding image pickup units 22a, 22c and an imaging area 22b1 of the center non-image forming image pickup unit 22b have the same size each other. The lens array 4a is covered with a not-illustrated light-shielding member except for parts of the range-finding lenses 5a, 5b at the front side of the lens array 4a so that light does not pass through the rest of the parts of the range-finding lenses 5a, 5b. Accordingly, an image is not formed on the imaging area 22b1 of the center non-image forming image pickup unit 22b.

The range-finding image pickup units 22a, 22c and the non-image forming image pickup unit 22b, which are integrally provided on the substrate 21, are, for example, a CCD, CMOS, or the like integrally formed with a later described semiconductor wafer by a known semiconductor processing. In the imaging areas (light receiving surfaces) 22a1, 22b1, 22c1, a large number of light receiving elements (pixels) are arranged in a grid-like manner.

In this Example, as shown in FIG. 13B, for example, a length D1 of a base line between the adjacent imaging areas 22a1 and 22b1 is about 3 mm, and a length D2 of a base line between the imaging areas 22a1 and 22c1 of the both side image pickup units 22a, 22c is about 6 mm.

The optical axes of the range-finding lenses 5a, 5b are parallel to each other. Diagonal centers of the imaging areas 22a1, 22c1 of the both side range-finding image pickup units 22a, 22c are positioned so as to substantially coincide with the optical axes of the range-finding lenses 5a, 5b, respectively. Field angles of the range-finding lenses 5a, 5b are equal to each other.

Each of the range-finding lenses 5a, 5b has a focal length so as to form a subject image on the imaging area 22a1, 22c1 from a subject light entering the range-finding lenses 5a, 5b.

On the circuit substrate 23, a range-finding calculation unit 24, a flare amount detection unit 25, and the like are provided. The flare amount detection unit 25 is configured to detect an amount of light due to flare entering the imaging area 22b1 of the center non-image forming image pickup unit 22b. As a state where the light due to flare enters the imaging area 22b1 of the center non-image forming image pickup unit 22b, there is a case where light from a strong light source such as sunlight enters the range-finding lenses 5a, 5b with a large incident angle, for example, light from a light source which has passed through the range-finding lens 5a enters the imaging area as a flare light. In this condition, light from the light source which has passed through the other range-finding lens 5b is reflected on an inner wall surface of the housing 20 and then enters the imaging area 22c1 of the range-finding image pickup unit 22c as a flare light, as described later in detail.

Since the light due to flare is unnecessary light, when the light due to flare enters at least one of the both side imaging areas 22a1, 22c1, error occurs when calculating deviation between the subject images formed on the imaging areas 22a1, 22c1, that is, disparity, so that range-finding accuracy may be reduced.

The range-finding calculation unit 24 loads the pixel output signal output from each of the imaging area 22a1, 22c1 of the both side range-finding image pickup units 22a, 22c in a normal state in which light due to flare does not enter at least one of the imaging areas 22a1, 22c1 of the both side range-finding image pickup unit 22a, 22c, calculate a deviation between the subject images formed on the imaging areas 22a1, 22c1, that is, disparity, and calculate a distance to the subject.

The range-finding calculation unit 24 removes influence of the flare light by using output in accordance with the light amount of the flare light entering the imaging area 22b1, which is detected by the flare amount detection unit 25 when flare in that the flare light enters at least one of the imaging areas 22a1, 22c1 of the both side range-finding image pickup units 22a, 22c occurs. Hereinafter, the output is referred to as a flare light amount output. Then, the range-finding calculation unit 24 calculates the deviation between the subject images formed on the imaging areas 22a1, 22c1, that is, the disparity. The calculation will be explained in detail later.

Since the flare light entering the imaging area 22c1 of the range-finding image pickup unit 22c is reflected on the inner wall surface of the housing 20, the light amount is less than a light amount of the flare light directly entering the imaging area 22b1 of the non-image forming image pickup unit 22b. Therefore, the flare amount detection unit 25 multiples the flare light amount output which is input from the imaging area 22b1 by a predetermined correction factor to set the output to be substantially equal to the output in accordance with the light amount of the flare light entering the imaging area 22c1

The distance information calculated in the range-finding calculation unit 24 is output to the control unit 14. The control unit 14 outputs a driving control signal to the focus lens driving unit 16 so as to focus on the subject based on the input distance information.

(Range-Finding Operation in Range-Finding Device 3)

Next, the range-finding operation by the range-finding device 3 when the subject is photographed by the digital camera 1 will be explained. At first, the range-finding operation when the flare light does not enter the range-finding device 3 will be explained and next, the range-finding operation when the flare light enters the range-finding device 3 and the flare occurs will be explained.

(Range-Finding Operation in Normal Condition without Flare Light)

When a photographer turns on the not-illustrated power switch to set the digital camera in a photographing mode, a range-finding start command signal is output to the range-finding device 3.

Figure 15:
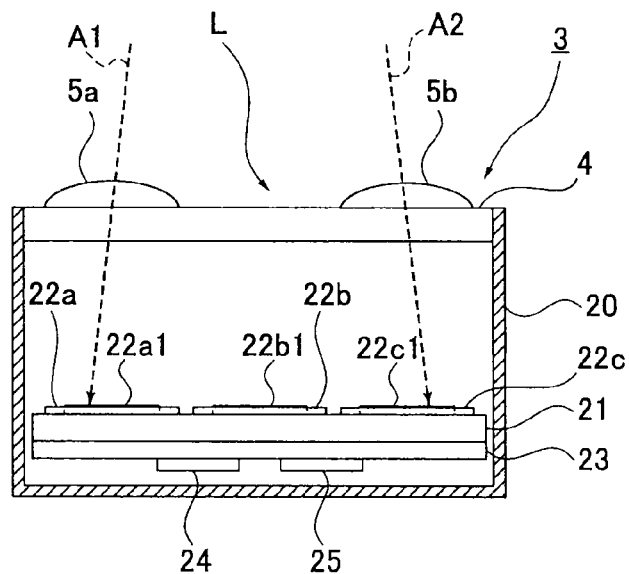
FIG. 15 is a view showing a state where subject light enters imaging areas of both side range-finding image pickup units.

When the range-finding operation starts, for example, as shown in FIG. 15, light from the subject entering the pair of range-finding lenses 5a, 5b is imaged on the imaging areas 22a1, 22c1 of the both side range-finding image pickup units 22a, 22c to form the subject images, respectively.

Then, the range-finding calculation unit 24 loads the pixel output signals output from pixels (light receiving elements) of the imaging areas 22a1, 22c1, on which the subject images are formed, and calculate the deviation between the subject images formed on the imaging areas 22a1, 22c1, that is, disparity so that the distance to the subject can be calculated with high accuracy. The information of the calculated distance to the subject is output to the control unit 14.

In this case, since the flare light does not enter the imaging areas 22a1, 22c1 of the both side range-finding image pickup units 22a, 22c, the flare light does not also enter the imaging area 22b1 of the center non-image forming image pickup unit 22b. Accordingly, detection of the light amount of the flare light is not performed by the flare amount detection unit 24.

The control unit 14 controls to drive the focal lens driving unit 16 based on the input distance information so as to move the focus lens groups of the photographic lens 2 to an in-focus position so that the subject image is formed on the light receiving surface of the CCD image sensor 11.

The signal processor 12 loads the pixel output signal output from each pixel of the CCD image sensor 11 and calculates a luminance of the subject based on intensity of the pixel output. The information of the calculated luminance of the subject is output to the control unit 14. Then, the control unit 14 sets an opened state, that is, an aperture value of the aperture stop unit 10 and a number of electrical shutter operations of the CCD image sensor 11 so as to be an appropriate exposure amount for the subject based on the input luminance information. The opened state of the aperture stop unit 10 is controlled by being driven by the aperture driving unit 18.

Then, the release button 6 is pressed, the subject is photographed in the in-focus state at the appropriate exposure condition including the number of the electric shutter operations of the CCD image sensor 11, the aperture value of the aperture stop unit 10, and the like. The signal processor 12 performs digital processing on the pixel output signal output from the CCD image sensor 11, loads the processed signal, and converts it into the image data capable of being displayed and recorded. The image data generated in the signal processor 12 is stored in the memory card 19 and displayed on the LCD monitor 15 as a still image.

(Range-Finding Operation in Condition where Flare Light Enter Range-Finding Device)

Figure 16A:
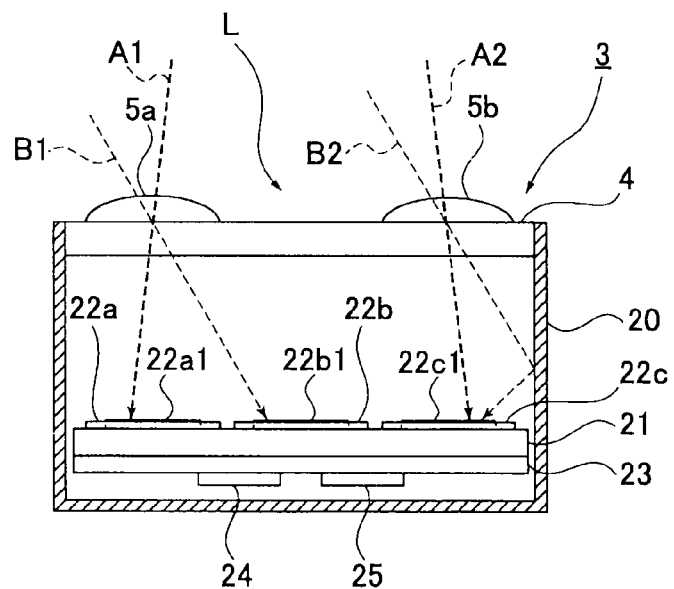
FIG. 16A is a view showing a state where flare light enters the imaging areas of the right side range-finding image pickup unit and the center non-image forming image pickup unit in Example 6.

When the range-finding operation starts, for example, as shown in FIG. 16A, lights A1, A2 from the subject entering the pair of range-finding lenses 5a, 5b enter the imaging areas 22a1, 22c1 of the both side range-finding image pickup units 22a, 22c to form the subject images, respectively.

At this time, for example, if a strong light source such as the sun is diagonally to the front side of the range-finding lens 5a and lights B1, B2 from the strong light source enters the range-finding lenses 5a, 5b with a large incident angle, the light B1 passing through the range-finding lens 5a enters the center imaging area 22b1 as the flare light. On the other hand, the light B2 passing through the range-finding lens 5b is reflected on the inner wall surface of the housing 20 and the reflected light enters the imaging area 22c1 as the flare light.

Figure 16B:
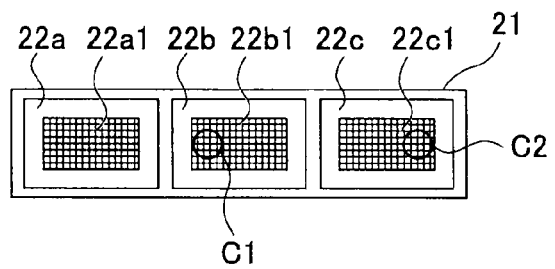
FIG. 16B is a view showing a state where the flare light enters the imaging areas of the right side range-finding image pickup unit and the center non-image forming image pickup unit in Example 6.
Figure 17:
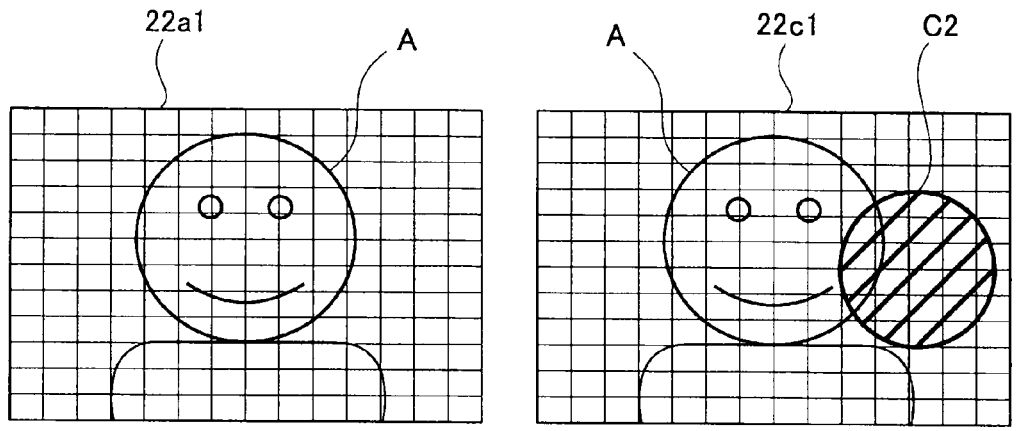
FIG. 17 is a view showing a state where the flare light is partially superimposed on the subject image formed on the imaging area of the left side range-finding image pickup unit and the subject image formed on the imaging area of the right side range-finding image pickup unit in Example 6.

As shown in FIG. 16B, each of the flare lights C1, C2 entering the imaging areas 22b1 and 22c1 is, for example, in the form of a ring. If the flare light C2 enters the imaging area 22c1 of the range-finding image pickup unit 22c, for example, as shown in FIG. 17, the flare light C2 is superimposed on a part of the formed subject image A. On the other hand, the flare light does not enter the imaging area 22a1 of the range-finding image pickup unit 22a and therefore only the subject image A is formed.

The flare light C2 entering the imaging area 22c1 of the range-finding image pickup unit 22c is unnecessary light, and therefore is deleterious light as a factor reducing the range-finding accuracy. Therefore, the output value from the imaging area 22c1 is a value obtained by superposing output in accordance with the light amount of the flare light C2 on the pixel output in accordance with the formed subject image A so that it is necessary to remove the output in accordance with the light amount of the flare light C2. In this condition, since the flare light C1 also enters the imaging area 22b1 of the center non-image forming image pickup unit 22b, output (electrical signal) of the flare light in accordance with the light amount of the flare light C1 from the imaging area 22b1 is detected by the flare amount detection unit 25.

Then, the range-finding calculation unit 24 loads the output from the imaging areas 22a1, 22c1. At this time, the output from the imaging area 22c1 includes the output due to the flare in accordance with the light amount of the flare light C2. Then, the range-finding calculation unit 24 subtracts the output of the light amount of the flare light detected by the flare amount detection unit 25 from the output from the imaging area 22c1 to remove output in accordance with the light amount of the flare light C2 entering the imaging area 22c1.

Thereby, the range-finding calculation unit 24 loads only the pixel output in accordance with the subject image formed on the imaging areas 22a1 and 22c1 and calculate the deviation between the subject images formed on the imaging areas 22a1, 22c1, that is, disparity so that the distance to the subject can be calculated with high accuracy. The following operations are same as the range-finding operation in the normal condition.

Figure 18A:
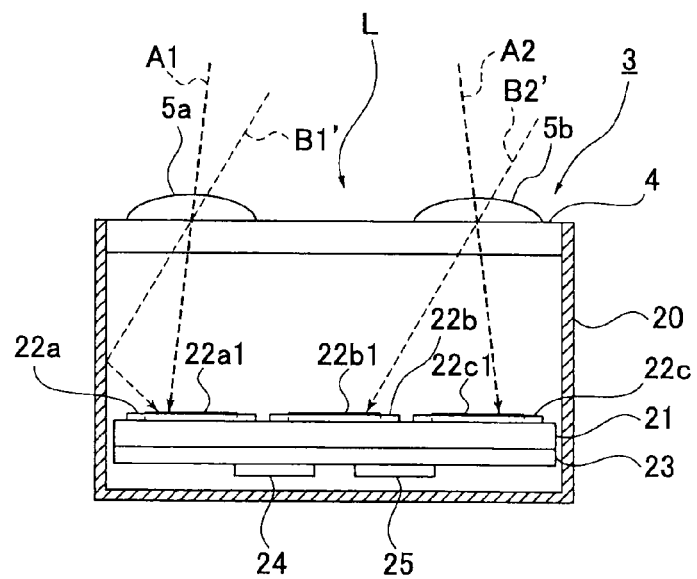
FIG. 18A is a view showing a state where flare light enters the imaging areas of the left side range-finding image pickup unit and the center non-image forming image pickup unit.
Figure 18B:
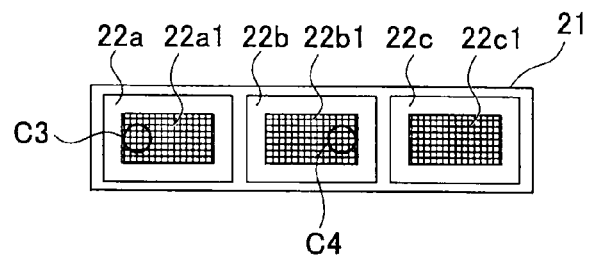
FIG. 18B is a view showing a state where the flare light enters the imaging areas of the right side range-finding image pickup unit and the center non-image forming image pickup unit.

As shown in FIGS. 18A, 18B, contrary to FIG. 16, if a strong light source such as the sun is diagonally to the front side of the range-finding lens 5b and lights B1', B2' from the strong light source enters the range-finding lenses 5a, 5b with a large incident angle. On the other hand, the light B2' passing through the range-finding lens 5b enters the center imaging area 22b1 as the flare light C4. In this case, the range-finding calculation unit 24 also subtracts the output of the light amount of the flare light of the imaging area 22b1 detected by the flare amount detection unit 25 from the output of the imaging area 22a1 to remove output in accordance with the light amount of the flare light C3 entering the imaging area 22a1.

As described above, according to the range-finding device 3 of this Example, even when flare where the flare light enters at least one of the imaging area 22a1, 22c1 of the both side range-finding image pickup unit 22a, 22c occurs, influence of the flare light can be removed by using the output of the light amount of the flare light of the imaging area 22b1 of the center range-finding pickup unit 22b detected by the flare amount detection unit 25 without providing a light shielding block having a light shielding wall forming a plurality of inclined surfaces between the range-finding lenses 5a, 5b and the imaging areas 22a, 22c as the conventional device.

Therefore, according to the range-finding device 3 of this Example, since it is not necessary to provide the light shielding wall having inclined surfaces in the range-finding device 3, small size and low cost can be achieved.

Example 7

In this Example, strong light sources as a factor that generates flare light are at diagonally front to each of the range-finding lenses 5a and 5b of the range-finding device 3.

Figure 19A:
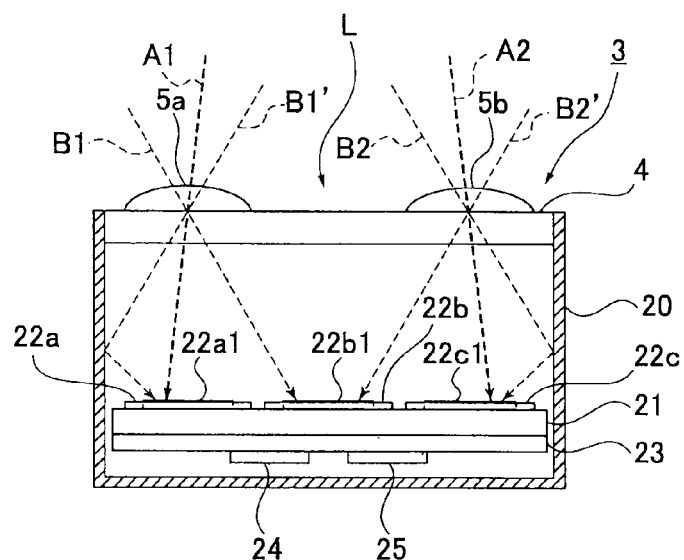
FIG. 19A is a view showing a state where flare light enters the imaging areas of the both side range-finding image pickup units and the center non-image forming image pickup unit in Example 7.
Figure 19B:
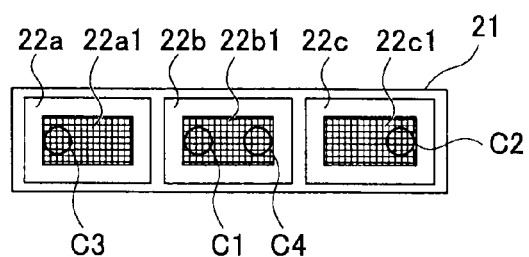
FIG. 19B is a view showing a state where the flare light enters the imaging areas of the both side range-finding image pickup units and the center non-image forming image pickup unit in Example 7.

As shown in FIGS. 19A, 19B, if lights B1, B2 from one not-illustrated light source disposed diagonally to the front side of the range-finding lens 5a enter the range-finding lenses 5a, 5b with a large incident angle, the light B1 passing through the range-finding lens 5a enters the center imaging area 22b1 as the flare light C4. On the other hand, the light B2 passing through the range-finding lens 5b is reflected on the inner wall surface of the housing 20 and enters the imaging area 22c1 as the flare light C2.

Further, as shown in FIGS. 19A, 19B, if lights B1', B2' from the other not-illustrated light source disposed diagonally to the front side of the range-finding lens 5b enter the range-finding lenses 5a, 5b with a large incident angle, the light B1' passing through the range-finding lens 5a is reflected on the inner wall surface of the housing 20 and enters the center imaging area 22a1 as the flare light C3. On the other hand, the light B2' passing through the range-finding lens 5b enters the center imaging area 22b1 as the flare light C4.

Figure 20:
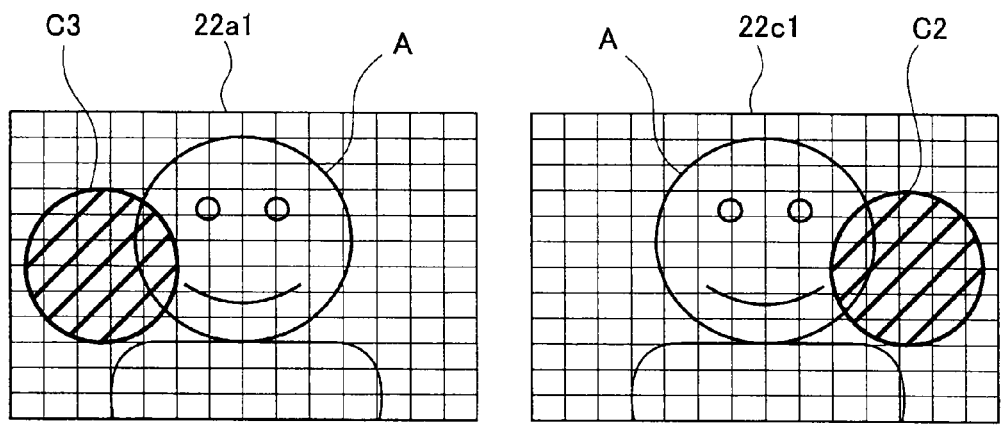
FIG. 20 is a view showing a state where flare light is partially superimposed on the subject image formed on the imaging areas of the both side range-finding image pickup units in Example 7.

As described above, in this Example, in a case where the flare light C2 enters the imaging area 22c1 and the flare light enters the imaging area 22a1, for example, as shown in FIG. 20, the flare lights C2, C3 are superimposed on a part of the formed subject image A. The flare lights C1, C4 enter vicinities of both sides of the center imaging area 22b1 from right and left (see FIG. 19).

Hereinafter, range-finding operations when the flare in that the flare light C2 enters the imaging area 22c1 and the flare light C3 enters the imaging area 22a1 occurs will be explained.

In the flare lights C1, C4 entering vicinities of the both sides of the center imaging area 22b1 (see FIG. 19B), the flare light C1 corresponds to the flare light C2 entering the imaging area 22c1 and the flare light C4 corresponds to the flare light C3 entering the imaging area 22a1.

In this Example, when removing influence of the flare light C2 entering the imaging area 22c1, the flare amount detection unit 25 is set to load the output from, for example, a half area of the imaging area 22b1, which the flare light C1 enters. Furthermore, when removing influence of the flare light C3 entering the imaging area 22a1, the flare amount detection unit 25 is set to load the output from, for example, a half area of the imaging area 22b1, which the flare light C4 enters.

In order to remove the influence of the flare light C2 entering the imaging area 22c1, at first, the flare amount detection unit 25 detects flare light amount output (electrical signal) in accordance with light amount of the flare light C1 from the half area of the imaging area 22b1, which the flare light C1 enters. Then, in order to remove the influence of the flare light C3 entering the imaging area 22a1, the flare amount detection unit 25 detects flare light amount output (electrical signal) in accordance with light amount of the flare light C4 from the half area of the imaging area 22b1, which the flare light C4 enters.

The range-finding calculation unit 24 loads the output from the imaging areas 22a1, 22c1. At this time, the output from the imaging area 22c1 includes the output due to the flare in accordance with the light amount of the flare light C2. The output from the imaging area 22a1 includes the output due to the flare in accordance with the light amount of the flare light C3.

Then, the range-finding calculation unit 24 subtracts the output of the light amount of the flare light C1 detected by the flare amount detection unit 25 from the output from the imaging area 22c1 to remove output in accordance with the light amount of the flare light C2 entering the imaging area 22c1. Further, the range-finding calculation unit 24 subtracts the output of the light amount of the flare light C4 detected by the flare amount detection unit 25 from the output from the imaging area 22a1 to remove output in accordance with the light amount of the flare light C3 entering the imaging area 22a1.

Thereby, the range-finding calculation unit 24 loads only the pixel output in accordance with the subject images formed on the imaging areas 22a1 and 22c1 and calculate the deviation between the subject images formed on the imaging areas 22a1, 22c1, that is, disparity so that the distance to the subject can be calculated with high accuracy.

According to the range-finding device and an imaging apparatus according to an embodiment of the present invention, if light from a strong light source enters the range-finding lens with a large incident angle, the light passing through the range-finding lens is reflected on the inner wall surface of the housing of the range-finding device and then enters the imaging area as unnecessary light (flare light). Therefore, the range-finding image pickup unit outputs an output including the output in accordance with light amount of the unnecessary light for pixel output (flare light) in accordance with the formed subject image.

Even in a such a case, the light amount of the unnecessary light (flare light) entering the non-image forming image pickup unit is detected by the flare amount detection unit and the detected unnecessary light amount is subtracted from the output from the range-finding image pickup units so that the influence of the unnecessary light (flare light) entering the range-finding image pickup units can be removed. Accordingly, it is not necessary to provide a light shielding block having a light-shielding wall having inclined surfaces in the range-finding device as the conventional device to remove the influence of the unnecessary light (flare light). Accordingly, small size and low cost can be achieved.

Third Embodiment

Example 8

Figure 21:
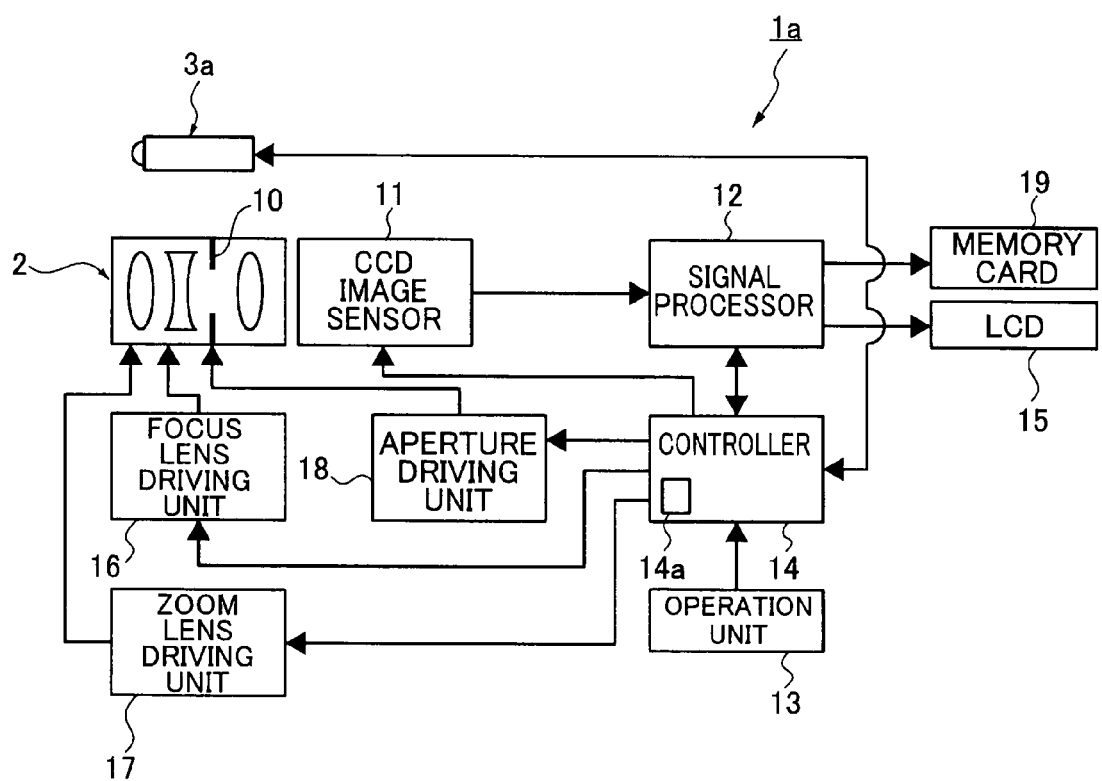
FIG. 21 is a block diagram schematically showing a system configuration of the digital camera according to Example 8.

FIG. 21 is a block diagram schematically showing a system configuration of a digital camera having the range-finding device according to this Example.

As shown in FIG. 21, the digital camera 1a according to this Example includes, in a controller 14, an autofocus controller (hereinafter, referred to as an AF controller) 14a configured to perform an autofocus control based on imaging signal loaded via the signal processor 12 from the CCD image sensor 11. The configuration of the digital camera 1a is similar to that in Example 1 shown in FIG. 2 and therefore explanation will be omitted. Although the range-finding device 3a shown in FIG. 21 is that of Example 2, the range-finding device of Examples 1 and 3 to 7 may be used.

The AF controller 14a loads the imaging signal output from the CCD image sensor 11 via the signal processor 12 and calculates an AF (autofocusing) evaluation value from the loaded imaging signal The AF evaluation value is calculated, for example, by an integrated value of outputs of a filter extracting a high frequency component, an integrated value of difference of luminance between adjacent pixels, and the like. In a case where the photographic lens is in-focus state, edge portions of the subject are clear and the largest high frequency component is obtained. Thereby, AF evaluation values at focusing positions of the photographic lens 2 are obtained when an AF operation (focus point detecting operation) is performed, and then determines a position having a maximal value as an in-focus position.

That is, when the release button 6 (see FIG. 1) is pressed, driving command is output from the AF controller 14a to the focus lens driving unit 16 to move the focus lens groups of the photographic lens 2 on an optical axis, that is, the AF operation of a contrast evaluation system which is a so-called climbing AF system. When an AF coverage area is from an infinite position to a close position, the focus lens groups of the photographic lens 2 move to focus positions so as to focus on a position from an infinite position to a close position or from a close position to an infinite position. Then, a maximal position in the AF evaluation values at the focus positions is determined as an in-focus position and to move the focus lens groups of the photographic lens 2 to the in-focus position.

As described above, since the digital camera 1a according to this Example has the AF controller 14a configured to perform the autofocus control from the imaging signal loaded from the CCD image sensor 11 in addition to the range-finding device 3a in the outer measurement system, the focusing operation based on the range-finding information obtained by the range-finding device 3a and the focusing operation by the AF controller 14a are simultaneously performed so that high-speed and high accuracy focusing can be achieved.

That is, in the focusing operation by the AF controller 14a, for example, when photographing at telephoto side where extending amount of lenses are large (zoom magnification ratio is large) is performed, the moving amount of the focus lens groups of the photographic lens 2 are increased so that long time for performing focusing operation is required.

On the other hand, in this Example, at first, the focus lens groups of the photographic lens 2 are rapidly moved to a position close to the in-focus position based on the distance information obtained by the range-finding device 3a and then, the focus lens groups of the photographic lens 2 are moved to the in-focus position by the focusing operation of the AF controller 14a so that the moving range of the focus lens groups when performing focusing operation by the AF controller 14a. Thereby, the rapid and accurate focusing can be performed and therefore photographing can be performed without missing a photo-opportunity.

By switching operation of the operation unit 13, it is possible to select one of the focusing operation based on the distance information obtained by the range-finding device 3a and the focusing operation by the AF controller 14a to perform the selected focusing operation (for example, of the range-finding device 3a).

Although in the above Examples, the range-finding device is applied to the digital camera, it may be applied to, for example, a digital video camera, a vehicle-mounted camera, a mobile-mounted camera, a monitoring camera, and the like.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A range-finding device comprising
   a plurality of two-dimensional image pickup units formed on a single substrate and disposed at a predetermined interval with each other, wherein each of the image pickup units comprises a plurality of light receiving elements, and wherein adjacent ones of the image pickup units are separated by a region of sufficient width that the substrate can be cut at a location between the image pickup units;
   a lens unit configured to form subject images of a subject on the plurality of image pickup units, the image pickup units on which the subject images are formed outputting signals of the subject images; and
   a calculator to calculate a distance to the subject based on the signals output from the image pickup units, wherein
   the subject images are formed through the lens unit on at least two image pickup units of the plurality of image pickup units, and
   the calculator is configured to calculate a distance to the subject based on the signals output from the at least two image pickup units on each of which the subject image is formed,
   wherein
   the lens unit has a lens array and a plurality of lenses integrally formed on the lens array and disposed so as to face the plurality of image pickup units,
   the plurality of lenses are two lenses arranged in a row so as to respectively face two both side image pickup units of the plurality of image pickup units between which at least one image pickup unit is disposed, and
   no further lens is provided at a center area corresponding to at least one of the image pickup units which is disposed between the two both sides image pickup units.

2. The range-finding device according to claim 1, wherein
   the plurality of image pickup units includes at least one non-image forming image pickup unit;
   the range-finding device includes a light amount detection unit configured to detect a light amount when unnecessary light enters the at least one non-image forming image pickup unit through the lens unit;
   when the unnecessary light enters the at least one non-image-forming image pickup unit, the light amount detection unit detects a light amount of the unnecessary light entering the at least one non-image forming image pickup unit; and
   the calculator subtracts the output of the light amount of the unnecessary light detected by the light amount detection unit from the output from the image pickup units to correct the output from the image pickup units before calculating a distance to the subject based on the output from the image pickup units.

3. The range-finding device according to claim 1, wherein
   the plurality of image pickup units includes at least one non-image forming image pickup unit;
   the range-finding device includes a light amount detection unit configured to detect a light amount when unnecessary light enters at least one non-image forming image pickup unit of the plurality of image pickup units through the lens unit;
   when first and second unnecessary lights enter the at least one non-image-forming image pickup unit, an imaging area of the at least one non-image forming image pickup unit is divided into a first area including an area which the first unnecessary light enters and a second area including an area which the second unnecessary light enters;
   the light amount detection unit detects a light amount of the first unnecessary light from the first area and a light amount of the second unnecessary light from the second area; and
   the calculator subtracts the output of the light amount of the first unnecessary light detected by the light amount detection unit from the output from one of the image pickup units and subtracts the output of the light amount of the second unnecessary light detected by the light amount detection unit from the output from another one of the image pickup units to correct the output from the image pickup units before calculating a distance to the subject based on the output from the image pickup units.

4. The range-finding device according to claim 1, wherein each of the two-dimensional image pickup units comprises a plurality of pixels.

5. An imaging apparatus, comprising
an imaging device having a photographic lens and configured to form an image of a subject through the photographic lens;
a range-finding device including
   a plurality of two-dimensional image pickup units formed on a single substrate and disposed at a predetermined interval with each other, wherein each of the image pickup units comprises a plurality of light receiving elements, and wherein adjacent ones of the image pickup units are separated by a region of sufficient width that the substrate can be cut at a location between the image pickup units;
   a lens unit configured to form subject images of the subject on the plurality of image pickup units, the image pickup units on which the subject images are formed outputting signals of the subject images; and
   a calculator to calculate a distance to the subject based on the signals output from the image pickup units; and
a focusing device configured to perform focusing operation based on the distance to the subject calculated by the range-finding device,
wherein
the subject images are formed through the lens unit on at least two image pickup units of the plurality of image pickup units, and
the calculator calculates a distance to the subject based on the signals output from the at least two image pickup units on each of which the subject image is formed,
wherein
the lens unit has a lens array and a plurality of lenses integrally formed on the lens array and disposed so as to face the plurality of image pickup units,
the plurality of lenses are two lenses arranged in a row so as to respectively face two both side image pickup units of the plurality of image pickup units between which at least one image pickup unit is disposed, and
no further lens is provided at a center area corresponding to at least one of the image pickup units which is disposed between the two both sides image pickup units.

6. The imaging apparatus according to claim 5, wherein each of the two-dimensional image pickup units comprises a plurality of pixels.

* * * * *